(12) United States Patent
Gemma et al.

(10) Patent No.: US 12,458,310 B2
(45) Date of Patent: Nov. 4, 2025

(54) MAMMOGRAPHY APPARATUS

(71) Applicant: FUJIFILM Corporation, Tokyo (JP)

(72) Inventors: Kohei Gemma, Kanagawa (JP); Takeyasu Kobayashi, Kanagawa (JP); Sayaka Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 203 days.

(21) Appl. No.: 18/454,758

(22) Filed: Aug. 23, 2023

(65) Prior Publication Data
US 2024/0065660 A1 Feb. 29, 2024

(30) Foreign Application Priority Data

Aug. 30, 2022 (JP) .................................. 2022-137269

(51) Int. Cl.
*A61B 6/50* (2024.01)
*A61B 6/04* (2006.01)
*G06T 7/00* (2017.01)

(52) U.S. Cl.
CPC ............ *A61B 6/502* (2013.01); *A61B 6/0414* (2013.01); *G06T 7/00* (2013.01); *G06T 2207/30068* (2013.01)

(58) Field of Classification Search
CPC .................. A61B 6/502; A61B 6/0414; G06T 2207/30068
See application file for complete search history.

(56) References Cited

U.S. PATENT DOCUMENTS

| | | | |
|---|---|---|---|
| 6,975,701 B2 * | 12/2005 | Galkin | A61B 6/4283 378/165 |
| 7,742,561 B2 * | 6/2010 | Ueki | A61B 6/4417 378/63 |
| 2006/0262899 A1 * | 11/2006 | Al-Khalidy | A61B 6/0414 378/37 |

(Continued)

FOREIGN PATENT DOCUMENTS

JP 2007-236805 A 9/2007

OTHER PUBLICATIONS

The extended European search report issued by the European Patent Office on Jan. 5, 2024, which corresponds to European Patent Application No. 23193977.8-1126 and is related to U.S. Appl. No. 18/454,758.

*Primary Examiner* — David J Makiya
(74) *Attorney, Agent, or Firm* — Studebaker Brackett PLLC

(57) ABSTRACT

A mammography apparatus includes an imaging table; a radiation source; a stand; the compression plate including a bottom plate that compresses the breast and side plates provided on at least two locations of a subject side and a stand side of the bottom plate; and a projector that projects an image toward the compression plate and the imaging table, in which in a case where an intersection between an imaginary plane formed by extending the inner wall surface toward the projector and an imaginary horizontal line crossing the projector in a horizontal direction is defined as an imaginary intersection, an optical element closest to the compression plate on an optical path directed from the projector to the compression plate is located on the subject side with respect to the imaginary intersection.

7 Claims, 15 Drawing Sheets

(56) References Cited

U.S. PATENT DOCUMENTS

| | | |
|---|---|---|
| 2009/0225936 A1* | 9/2009 | Kashiwagi ............... A61B 6/08 |
| | | 378/98.3 |
| 2015/0164426 A1* | 6/2015 | Goossen .............. A61B 5/7445 |
| | | 600/407 |
| 2016/0135767 A1* | 5/2016 | Kim ........................ A61B 6/08 |
| | | 378/62 |
| 2017/0172531 A1 | 6/2017 | Sugiyama et al. |
| 2022/0047163 A1* | 2/2022 | Takata ................... A61B 6/502 |
| 2022/0096025 A1* | 3/2022 | Fujimoto ................ A61B 6/461 |
| 2022/0101524 A1* | 3/2022 | Konno ................... A61B 6/025 |
| 2022/0101553 A1* | 3/2022 | Konno ................... G06T 7/0012 |
| 2023/0005149 A1* | 1/2023 | Nakayama ............... G06T 7/90 |

* cited by examiner

MAMMOGRAPHY APPARATUS

CROSS-REFERENCE TO RELATED APPLICATION

This application claims priority from Japanese Patent Application No. 2022-137269, filed Aug. 30, 2022, the disclosure of which is incorporated herein by reference in its entirety.

BACKGROUND

Technical Field

The present disclosure relates to a mammography apparatus.

Related Art

JP2007-236805A discloses an X-ray diagnostic apparatus for mammography comprising: X-ray exposure means for exposing X-rays, an X-ray plane detector for detecting X-rays incident on a detection surface, a compression plate for compressing and fixing a breast, and projection means for projection a reference image which is referred to in a case of fixing the breast by the compression plate onto the compression plate or the detection surface. The technology described in JP2007-236805A discloses that the projection means (for example, a projector) is used to project the reference image (for example, a skin line) for positioning the breast onto the compression plate or the detection surface.

However, in the technology disclosed in JP2007-236805A, vignetting of an image that occurs in a case of projecting the image from a projector onto a compression plate is not considered.

For example, the compression plate may have a box shape having a plurality of side plates on a peripheral edge of a bottom plate that compresses a breast. In this case, a part of an effective luminous flux of projection light emitted from the projector may be blocked by the side plate on a stand side. As a result, vignetting may occur in the image projected onto the compression plate, and a visibility of the image on the compression plate may deteriorate.

SUMMARY

The technology of the present disclosure provides a mammography apparatus capable of suppressing vignetting in an effective luminous flux of light emitted from a projector.

A first aspect of the technology of the present disclosure is a mammography apparatus comprising: an imaging table on which a breast of a subject is placed; a radiation source that emits radiation toward the breast; a stand that directly or indirectly supports the radiation source and the imaging table; a compression plate that is disposed to be movable between the imaging table and the radiation source and is directly or indirectly supported by the stand, the compression plate including a bottom plate that compresses the breast and side plates provided on at least two locations of a subject side and a stand side of the bottom plate; and a projector that is disposed on the stand side with respect to the radiation source and projects an image toward the compression plate and the imaging table through a plurality of optical elements, in which in a case where a surface on the subject side in the side plate on the stand side is defined as an inner wall surface of the side plate, and an intersection between an imaginary plane formed by extending the inner wall surface toward the projector and an imaginary horizontal line crossing the projector in a horizontal direction is defined as an imaginary intersection, among the plurality of optical elements, an optical element closest to the compression plate on an optical path of light emitted from the projector and directed to the compression plate is disposed on the subject side with respect to the imaginary intersection.

A second aspect according to the technology of the present disclosure is the mammography apparatus according to the first aspect, in which the inner wall surface is parallel to a movement direction of the compression plate, and a light beam located closest to the stand side in an effective luminous flux emitted from the projector is parallel to the movement direction.

A third aspect of the technology of the present disclosure is the mammography apparatus according to the second aspect, in which on a surface of the bottom plate onto which the image is projected, a position where the inner wall surface rises coincides with a projection position of the light beam located closest to the stand side in the effective luminous flux.

A fourth aspect according to the technology of the present disclosure is the mammography apparatus according to the second aspect, in which in a case where the compression plate is located closest to the projector, on a surface of the bottom plate onto which the image is projected, a projectable range of the image is located on the subject side with respect to the inner wall surface.

A fifth aspect of the technology of the present disclosure is the mammography apparatus according to the first aspect, in which the inner wall surface is parallel to a normal direction of a surface of the bottom plate onto which the image is projected.

A sixth aspect of the technology of the present disclosure is the mammography apparatus according to the first aspect, in which an upper end of the inner wall surface is inclined toward the stand side with respect to a normal direction of a surface of the bottom plate onto which the image is projected.

A seventh aspect of the technology of the present disclosure is the mammography apparatus according to the first aspect, in which the image includes information indicating an imaging condition for imaging the breast, and in the compression plate, a region onto which the information is projected is subjected to light transmission suppression processing for suppressing transmission of light.

The technology of the present disclosure can provide a mammography apparatus capable of suppressing vignetting in an effective luminous flux of light emitted from a projector.

DETAILED DESCRIPTION

Figure 1:
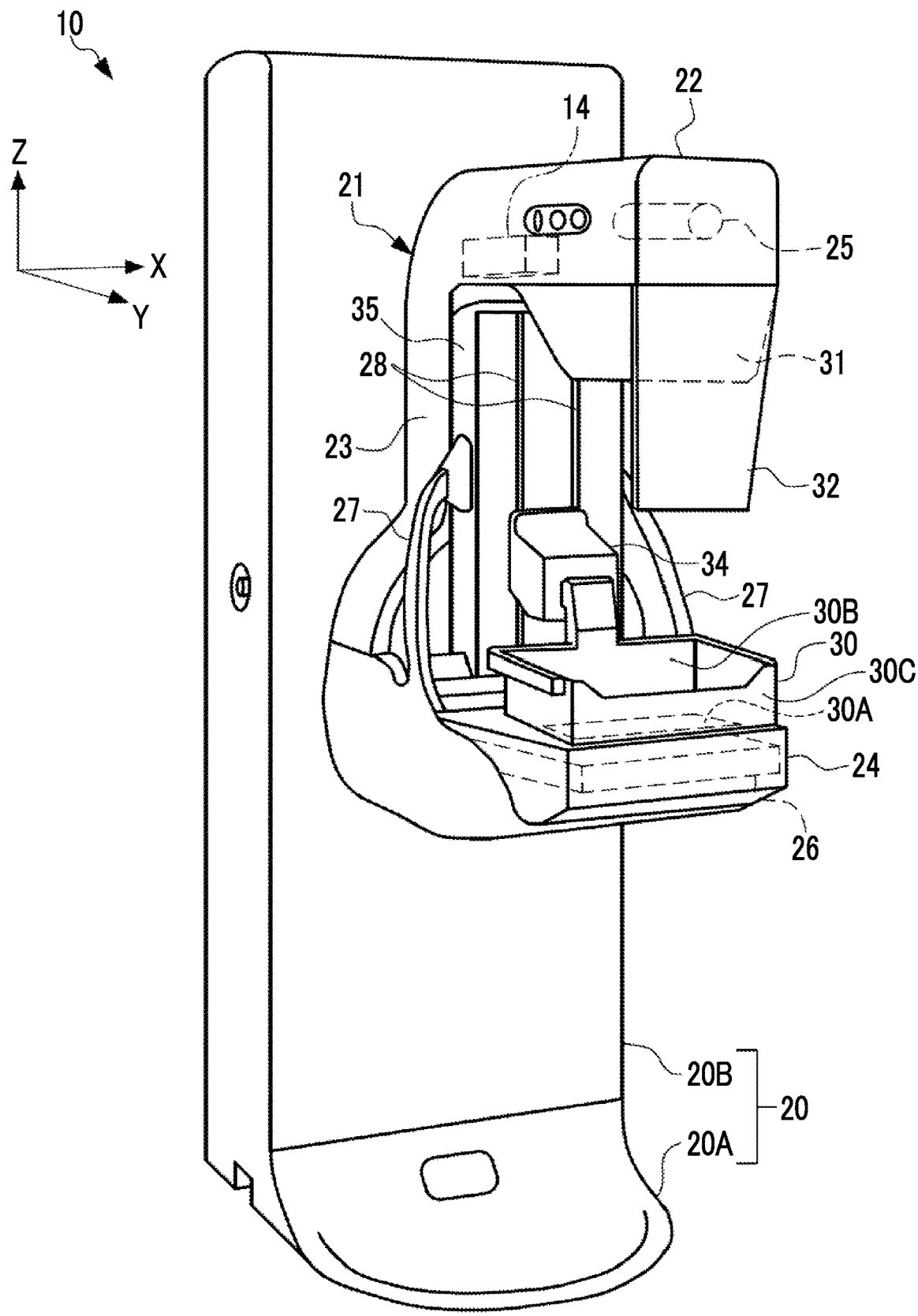
FIG. 1 is an external perspective view showing an example of a configuration of a mammography apparatus.

Hereinafter, an embodiment of the present disclosure will be described in detail with reference to the drawings.

In the following description, for convenience of explanation, a height direction of a stand 20 of a mammography apparatus 10 is indicated by an arrow Z, an arrow Z direction is defined as an upward direction of the mammography apparatus 10, and an upward side of the mammography apparatus 10 is defined as an upper side of the mammography apparatus 10. In the description of a structure illustrated below, "upper" refers to the upper side of the mammography apparatus 10. Further, in the following description, for convenience of explanation, a direction opposite to the upward direction of the mammography apparatus 10 is defined as a downward direction of the mammography apparatus 10, and a downward side of the mammography apparatus 10 is defined as a lower side of the mammography apparatus 10. In the description of the structure illustrated below, "lower" refers to the lower side of the mammography apparatus 10.

In the following description, for convenience of explanation, an arrow X direction orthogonal to the arrow Z direction is defined as a right direction, and a rightward side of the mammography apparatus 10 is defined as a right side of the mammography apparatus 10. In the description of the structure illustrated below, "right" refers to the right side of the mammography apparatus 10.

Further, in the following description, for convenience of explanation, a direction opposite to the arrow X direction is defined as a left direction, and a leftward side of the mammography apparatus 10 is defined as a left side of the mammography apparatus 10. In the description of the structure illustrated below, "left" refers to the left side of the mammography apparatus 10.

Further, in the following description, for convenience of explanation, a direction orthogonal to the arrow Z direction and the arrow X direction is indicated by an arrow Y, an arrow Y direction is defined as a frontward direction of the mammography apparatus 10, and a frontward side of the mammography apparatus 10 is defined as a front side of the mammography apparatus 10. In the description of the structure illustrated below, "front" refers to the front side of the mammography apparatus 10.

Further, in the following description, for convenience of explanation, a direction opposite to the frontward direction of the mammography apparatus 10 is defined as a rearward direction of the mammography apparatus 10, and a rearward side of the mammography apparatus 10 is defined as a rear side of the mammography apparatus 10. In the description of the structure illustrated below, "rear" refers to the rear side of the mammography apparatus 10.

In the present embodiment, a "vertical direction" refers not only to a perfect vertical direction but also to a vertical direction in the sense of including an error that is generally acceptable in the technical field to which the technology of the present disclosure belongs and that does not contradict the concept of the technology of the present disclosure. The same applies to a "horizontal direction". The "horizontal direction" refers not only to a perfect horizontal direction but also to a horizontal direction in the sense of including an error that is generally acceptable in the technical field to which the technology of the present disclosure belongs and that does not contradict the concept of the technology of the present disclosure.

Figure 2:
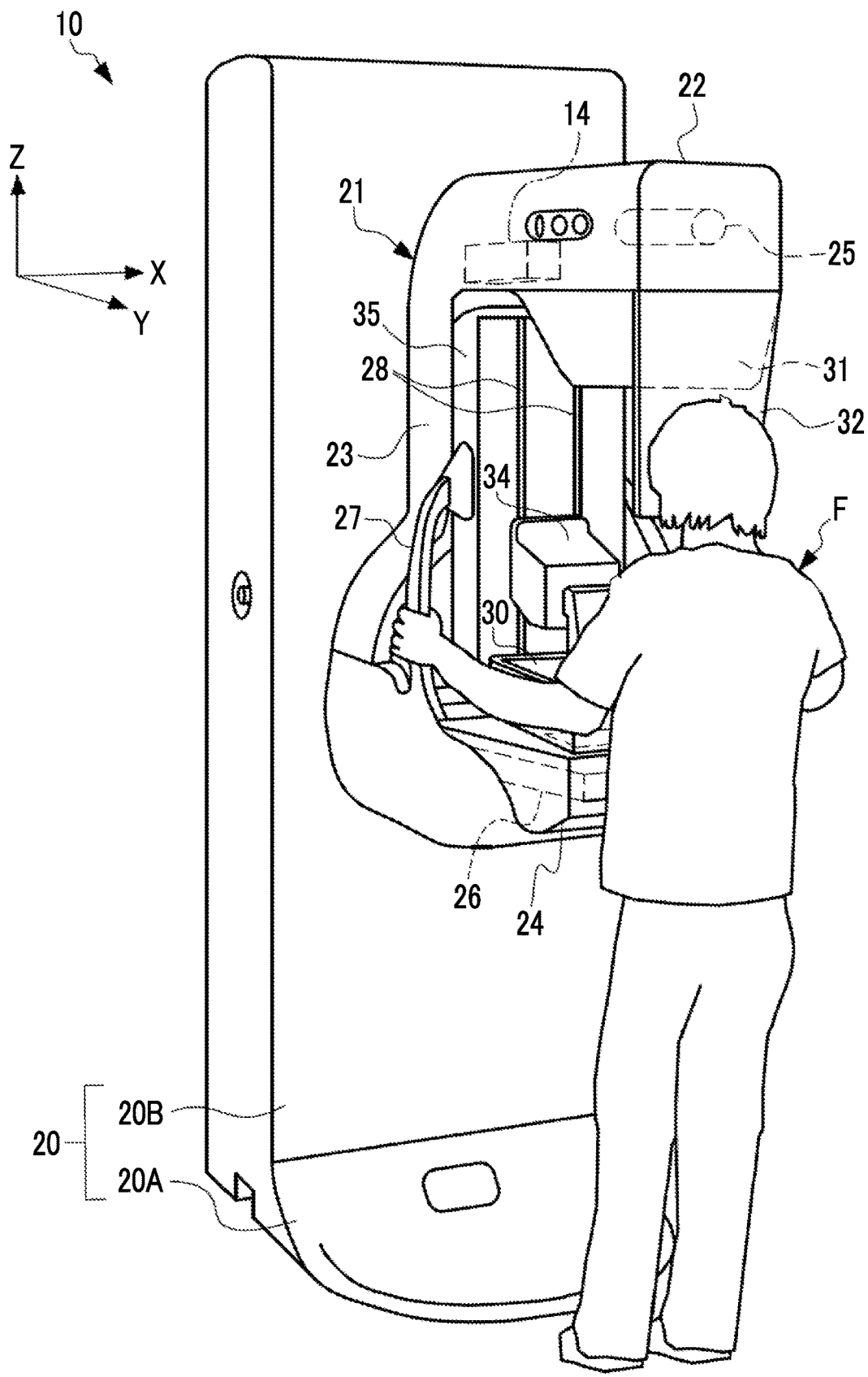
FIG. 2 is an external perspective view showing an example of a usage mode of the mammography apparatus.
Figure 3:
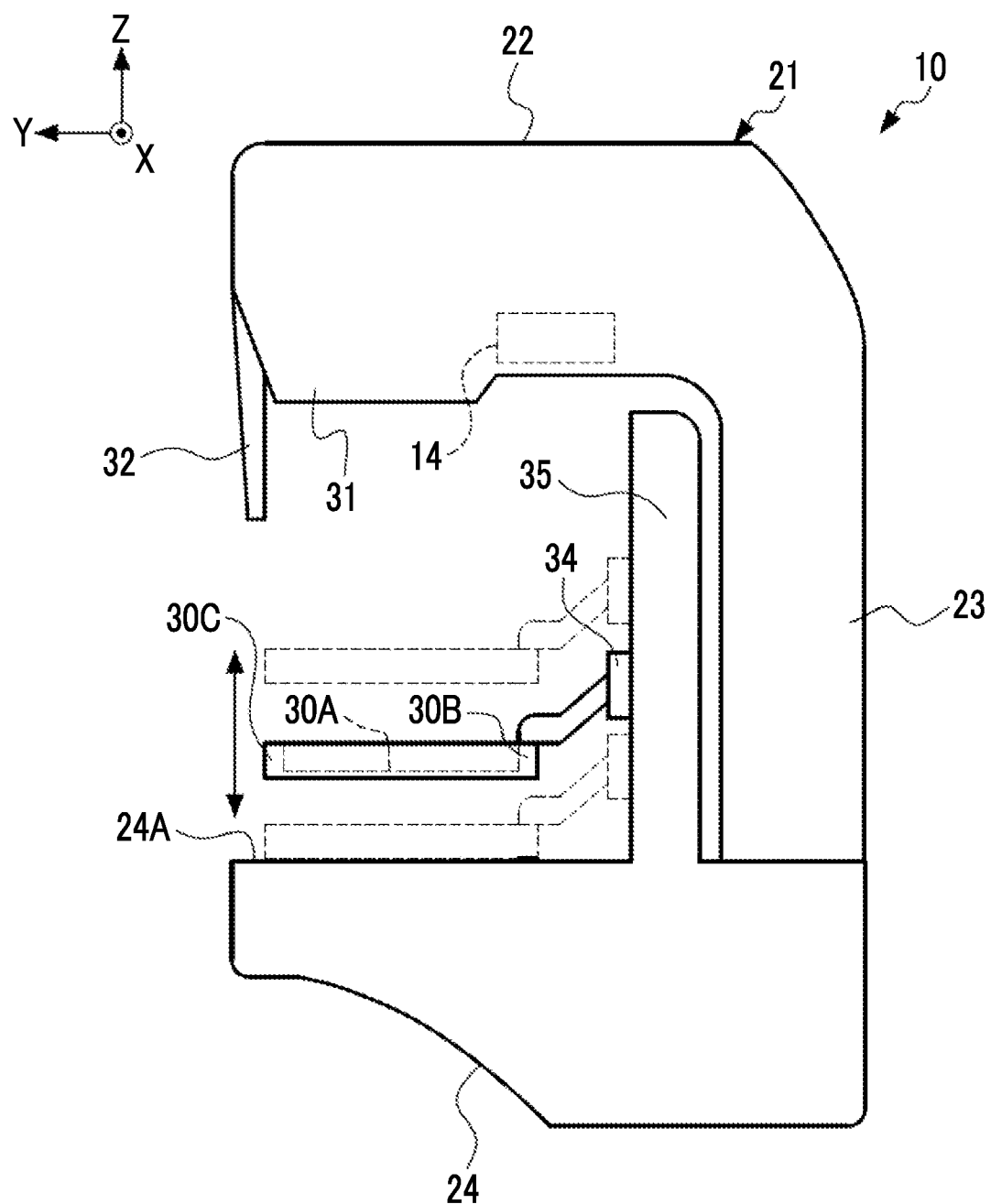
FIG. 3 is an external side view showing an example of the configuration of the mammography apparatus.

As shown in FIGS. 1 to 3, the mammography apparatus 10 according to a first embodiment is a radiography apparatus that irradiates a breast M (see FIG. 4) of a subject F to be examined with radiation and captures a radiographic image of the breast M. The radiation is X-rays as an example, but y-rays may also be used. The subject F is located on the front side with respect to the mammography apparatus 10. The subject F is an example of a "subject" according to the technology of the present disclosure.

The mammography apparatus 10 is connected to a console (not shown). The console has a setting function of setting the mammography apparatus 10 in accordance with an imaging order and a function of acquiring a radiographic image captured by the mammography apparatus 10 and displaying the acquired radiographic image. The console is communicably connected to an image database server (not shown) via a network (not shown) such as a local area network (LAN).

The mammography apparatus 10 includes a stand 20 and an arm 21. The stand 20 includes a pedestal 20A that is provided on a floor of a radiography room and a support column 20B that extends from the pedestal 20A in a height direction. The arm 21 has a substantially C-shape as viewed sidewise and is connected to the support column 20B. Since the arm 21 is movable in a height direction with respect to the support column 20B, a height of the arm 21 can be adjusted according to a height of the subject F. The arm 21 is rotatable about a rotation axis perpendicular to the support column 20B. The stand 20 is an example of a "stand" according to the technology of the present disclosure.

The arm 21 is composed of a radiation source accommodation portion 22, a main body portion 23, and an imaging table 24. A radiation source 25 is accommodated in the radiation source accommodation portion 22. The breast M of the subject F is placed on the imaging table 24. The imaging table 24 is an example of an "imaging table" according to the technology of the present disclosure. A radiation detector 26 is accommodated in the imaging table 24. The main body portion 23 integrally connects the radiation source accommodation portion 22 and the imaging table 24. The main body portion 23 holds the radiation source accommodation portion 22 and the imaging table 24 at positions facing each other. Handrails 27 for the subject F to hold are provided on both sides of the main body portion 23.

As described above, the arm 21 is connected to the support column 20B of the stand 20. In addition, the arm 21 has the radiation source accommodation portion 22 and the imaging table 24, and the radiation source 25 is accommodated in the radiation source accommodation portion 22. That is, the radiation source 25 and the imaging table 24 are supported by the stand 20 via the arm 21.

The radiation source 25 emits radiation toward the breast M placed on the imaging table 24. The radiation source 25 is an example of a "radiation source" according to the technology of the present disclosure. The radiation emitted from the radiation source 25 is transmitted through the compression plate 30 and then is incident on the breast M. The radiation detector 26 detects the radiation transmitted through the breast M and outputs a radiographic image. The radiation detector 26 is referred to as a flat panel detector (FPD). The radiation detector 26 may be an indirect conversion type that includes a scintillator converting the radiation into visible light and converts the visible light emitted from the scintillator into an electric signal or a direct conversion type that directly converts the radiation into an electric signal.

An irradiation field limiter 31 is provided between the radiation source accommodation portion 22 and the imaging table 24. The irradiation field limiter 31 is also referred to as a collimator and defines an irradiation field of the radiation to the imaging table 24.

A face guard 32 is attached to the radiation source accommodation portion 22. The face guard 32 is formed of or coated with a material not transmitting the radiation and protects a face of the subject F from the radiation.

The compression plate 30 is provided between the imaging table 24 and the irradiation field limiter 31 to sandwich the breast M with the imaging table 24 and compress the breast M. The compression plate 30 is an example of a "compression plate" according to the technology of the present disclosure. The compression plate 30 is formed of a material that transmits the radiation. The compression plate 30 is disposed at a position facing the imaging table 24.

The compression plate 30 comprises a bottom plate 30A. The bottom plate 30A compresses the breast M by sandwiching the breast M with the imaging table 24. Further, the compression plate 30 comprises a rear end wall 30B provided at a rear end of the bottom plate 30A and a front end wall 30C provided at a front end of the bottom plate 30A. In the present embodiment, the compression plate 30 has a box shape in which the upper surface side is open, but this is only an example. The technology of the present disclosure is established as long as the compression plate 30 comprises at least the rear end wall 30B and the front end wall 30C. The bottom plate 30A is an example of a "bottom plate" according to the technology of the present disclosure. The rear end wall 30B and the front end wall 30C are examples of "side plates" according to the technology of the present disclosure. The rear end wall 30B is an example of a "stand-side side plate" according to the technology of the present disclosure.

A projector 14 is accommodated in the radiation source accommodation portion 22. The projector 14 is disposed on the rear side with respect to the radiation source 25 in the radiation source accommodation portion 22. The projector 14 projects an image toward an imaging surface 24A of the imaging table 24. Here, the imaging surface 24A is a surface facing the radiation source 25 on the imaging table 24. In addition, the projector 14 projects an image toward a surface facing the radiation source 25 on the compression plate 30. Here, the surface of the compression plate 30 facing the radiation source 25 is the bottom plate 30A of the compression plate 30. The projector 14 is an example of a "projector" according to the technology of the present disclosure.

A drive mechanism 35 movably supports the compression plate 30 between the radiation source 25 and the imaging table 24. Further, a movable portion 34 is disposed between the compression plate 30 and the drive mechanism 35. The movable portion 34 is slidably held by a rail 28 provided in the drive mechanism 35. The rail 28 extends in an up-down direction.

The compression plate 30 is attached to the movable portion 34. The movable portion 34 moves in the up-down direction together with the compression plate 30 by the drive mechanism 35 described later. The up-down direction is functionally a direction in which the compression plate 30 moves toward the imaging table 24 (downward direction) and a direction in which the compression plate 30 moves away from the imaging table 24 (upward direction). As described above, the compression plate 30 is configured to be movable in such a manner that a distance between the compression plate 30 and the imaging table 24 (corresponding to a height h described later) is changed.

The compression plate 30 is attached to the drive mechanism 35 via the movable portion 34. Further, the drive mechanism 35 is provided in the imaging table 24. Further, as described above, the imaging table 24 is supported by the stand 20 via the arm 21. Therefore, the compression plate 30 is indirectly supported by the stand 20.

Figure 4:
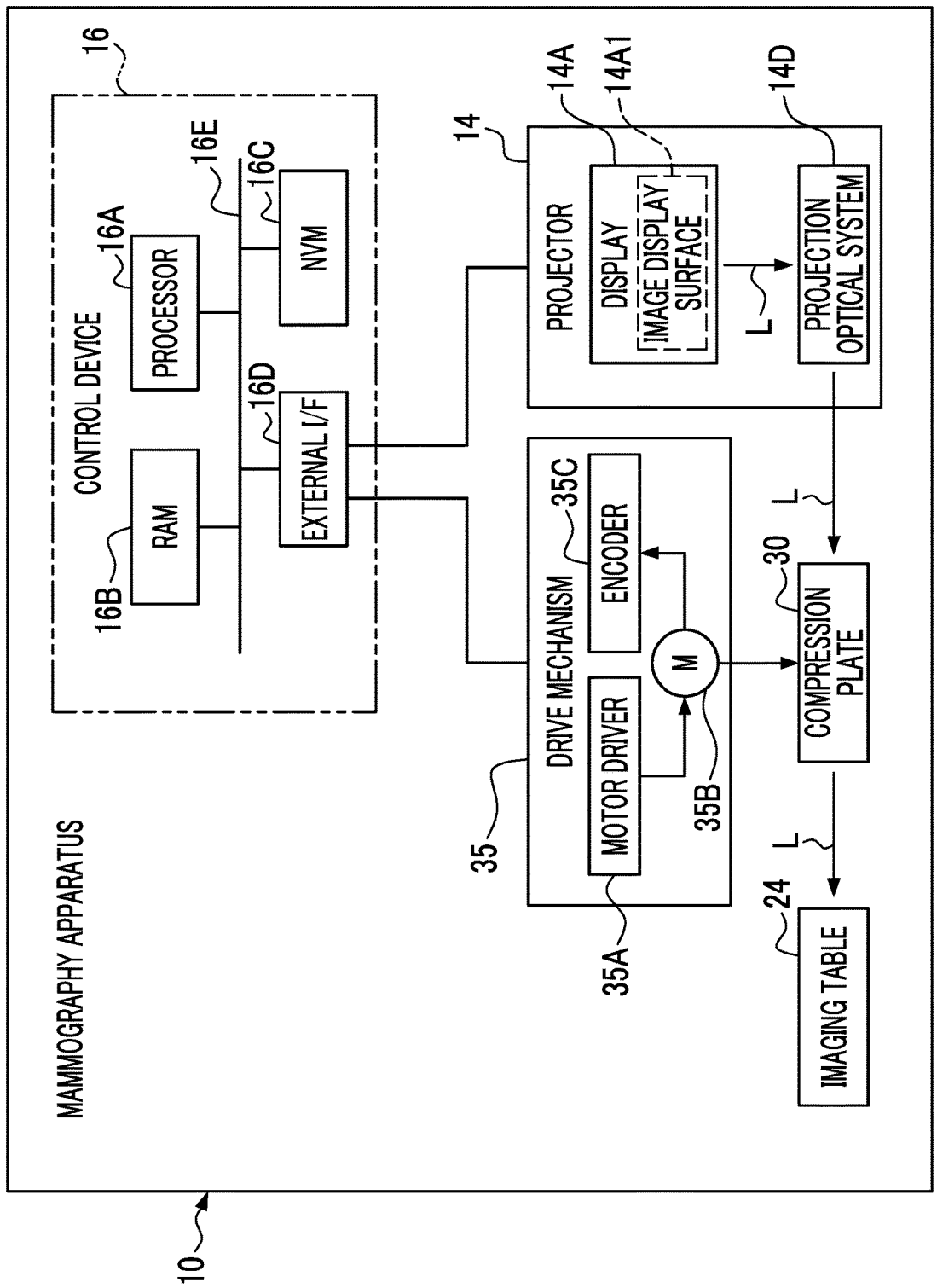
FIG. 4 is a block diagram showing an example of the configuration of the mammography apparatus.

As shown in FIG. 4, the mammography apparatus 10 comprises a control device 16. The control device 16 comprehensively controls the operation of each part of the mammography apparatus 10, such as the radiation source 25, the radiation detector 26, the arm 21, the drive mechanism 35, and the projector 14. In FIG. 4, control targets of the control device 16 are shown only for the drive mechanism 35 and the projector 14, and the others are not shown.

The control device 16 comprises, for example, a processor 16A, a random access memory (RAM) 16B, a non-volatile memory (NVM) 16C, and an external interface (I/F) 16D. The processor 16A, the RAM 16B, the NVM 16C, and the external I/F 16D are electrically connected via a bus 16E.

The processor 16A is, for example, a central processing unit (CPU), controls each part, and performs image processing as described later. The RAM 16B is a memory in which information is temporarily stored, and is used as a work memory by the processor 16A. The NVM 16C is a non-volatile storage device that stores various programs, various parameters, and the like. Examples of the NVM 16C include a flash memory (for example, an electrically erasable and programmable read only memory (EEPROM) and/or a solid state drive (SSD). The flash memory is merely an example, and other non-volatile storage devices, such as a hard disk drive (HDD), may be employed or a combination of two kinds or more of non-volatile storage devices may be employed.

The external OF 16D manages the exchange of information between the control device 16, and the projector 14 and the drive mechanism 35. The external OF 16D outputs, for example, a signal for emitting projection light L representing an image to be projected to the projector 14. In addition, the external OF 16D outputs, for example, a signal for controlling the operation of the drive mechanism 35 to the drive mechanism 35.

Figure 5:
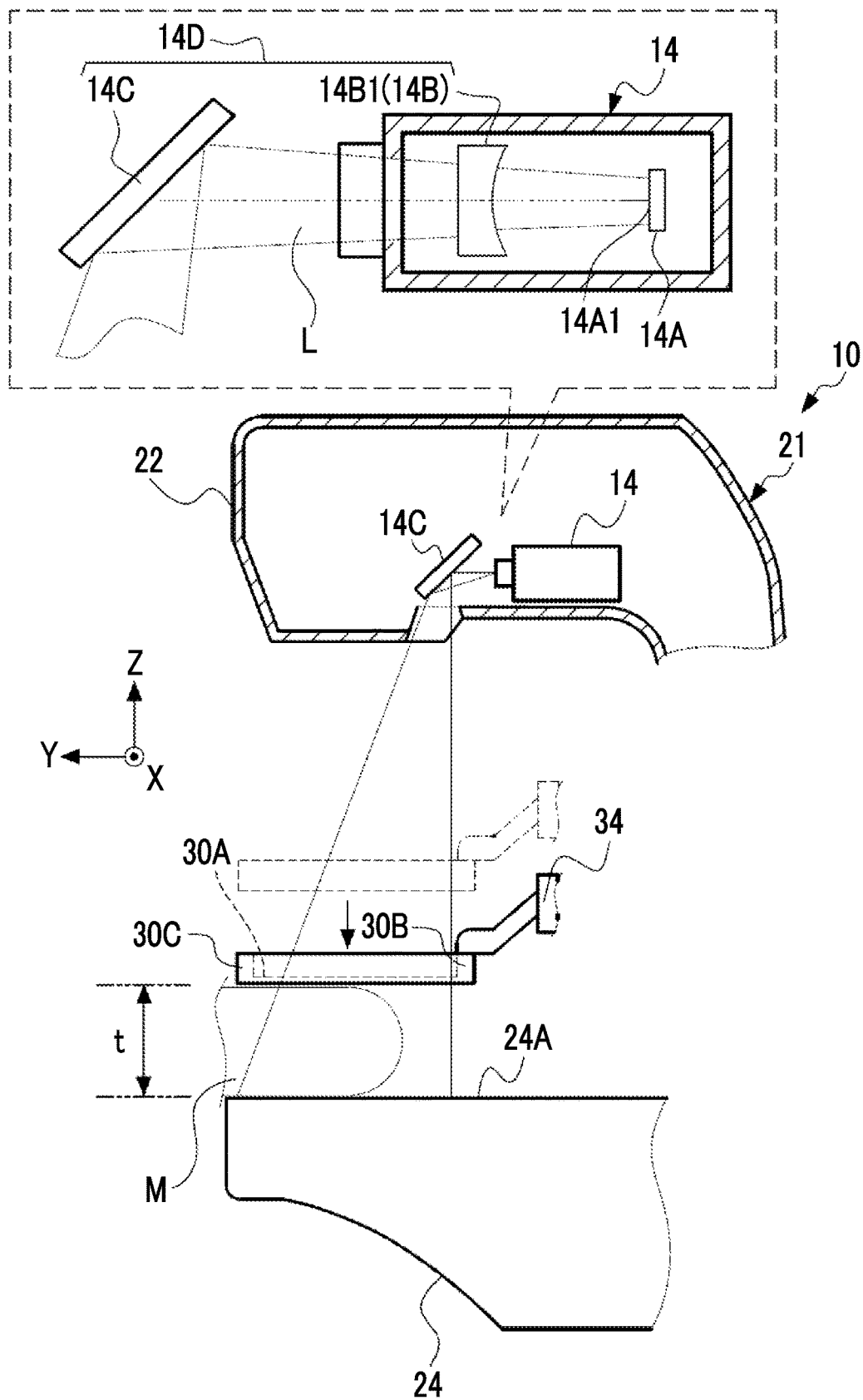
FIG. 5 is a side view showing an example of projection of an image in the mammography apparatus.

The projector 14 comprises a display 14A that displays an image to be projected and a projection optical system 14D that magnifies and projects the image displayed on the display 14A (see also FIG. 5). The control device 16 controls the display of the image on an image display surface 14A1 of the display 14A. Examples of the display 14A include a liquid crystal display (LCD) or a digital micromirror device (DMD). As is well known, the DMD comprises a plurality of micromirrors corresponding to a plurality of pixels. As an example, by changing an angle of each micromirror, a reflection direction of light from a light source is changed between on-light that is incident on the projection optical system 14D and off-light that is not incident on the projection optical system 14D. Then, a light quantity for each pixel is adjusted according to the duration of the on-light. In this way, optical modulation is performed to put information about the image to be projected on the projection light L by changing the angles of the plurality of micromirrors corresponding to the plurality of pixels. In a case where the display 14A is the DMD, an arrangement surface on which the plurality of micromirrors are two-dimensionally arranged corresponds to the image display surface 14A1, and the control of the micromirrors according to the image to be projected corresponds to the image display. As is well known, the LCD comprises a plurality of liquid crystal cells corresponding to a plurality of pixels, and changes a transmission state of the light from the light source for each liquid crystal cell to perform the optical modulation according to the image to be projected. In a case where the display 14A is the LCD, an arrangement surface on which the plurality of liquid crystal cells are two-dimensionally arranged corresponds to the image display surface 14A1. Although the display 14A is schematically shown in FIGS. 4 and 5, the display 14A includes a light source. In addition, as the display 14A, self-luminous light emitting elements such as organic EL elements may be arranged two-dimensionally to function as the image display surface 14A1.

The projection light L emitted from the display 14A is incident on the projection optical system 14D, passes through the projection optical system 14D, and is projected onto the bottom plate 30A of the compression plate 30. Further, the projection light L that has passed through the compression plate 30 is projected onto the imaging surface 24A of the imaging table 24. The projection optical system 14D includes a plurality of optical elements, magnifies an image generated in the display 14A, and projects the image toward the compression plate 30 and the imaging table 24. The projection optical system 14D is composed of a built-in optical system 14B incorporated inside a main body of the projector 14 (see FIG. 5) and an optical element disposed outside the main body of the projector 14. For example, the built-in optical system 14B includes one or more lenses 14B1 as optical elements. The optical element disposed outside the main body is a minor 14C (see FIG. 5) in this example. For example, the minor 14C is disposed in a posture inclined by 45° with respect to an optical axis of the built-in optical system 14B, and changes a propagation path of the projection light L emitted from the built-in optical system 14B by 90° toward the compression plate 30 and the imaging table 24. The projection optical system 14D is an example of "a plurality of optical elements" according to the technology of the present disclosure.

The drive mechanism 35 includes a motor driver 35A, a motor 35B, and an encoder 35C. The motor driver 35A operates the motor 35B based on a signal output from the processor 16A via the external OF 16D. The motor 35B rotates in response to an electric drive signal output by the motor driver 35A and moves the compression plate 30 via a power transmission mechanism (for example, a feed screw mechanism) (not shown). The encoder 35C converts an amount of mechanical displacement of the rotation of the motor 35B into an electric signal and outputs the electric signal to the processor 16A.

The encoder 35C is used to detect a movement amount of the compression plate 30. The encoder 35C is, for example, a rotary encoder in which a photosensor is combined with a rotary plate in which a plurality of small holes that transmit light are arranged on a circumference at regular intervals and that rotates together with a rotary shaft of the motor 35B. As is well known, the rotary encoder receives pulsed beams intermittently output from the small holes with the rotation of the rotary plate by the photosensor, and outputs an encoder pulse according to the number of the received pulsed beams. The encoder pulse is an example of an electric signal representing the amount of mechanical displacement of the rotation of the motor 35B. The processor 16A derives a rotation amount of the motor 35B by counting the encoder pulse and detects the movement amount of the compression plate 30 from the derived rotation amount. The encoder 35C may be a linear encoder that detects the movement amount of the compression plate 30 instead of the rotary encoder. Further, a pulse motor may be used as the motor 35B, and the movement amount of the compression plate 30 may be detected by counting drive pulses output by the processor 16A to the motor 35B.

Figure 6:
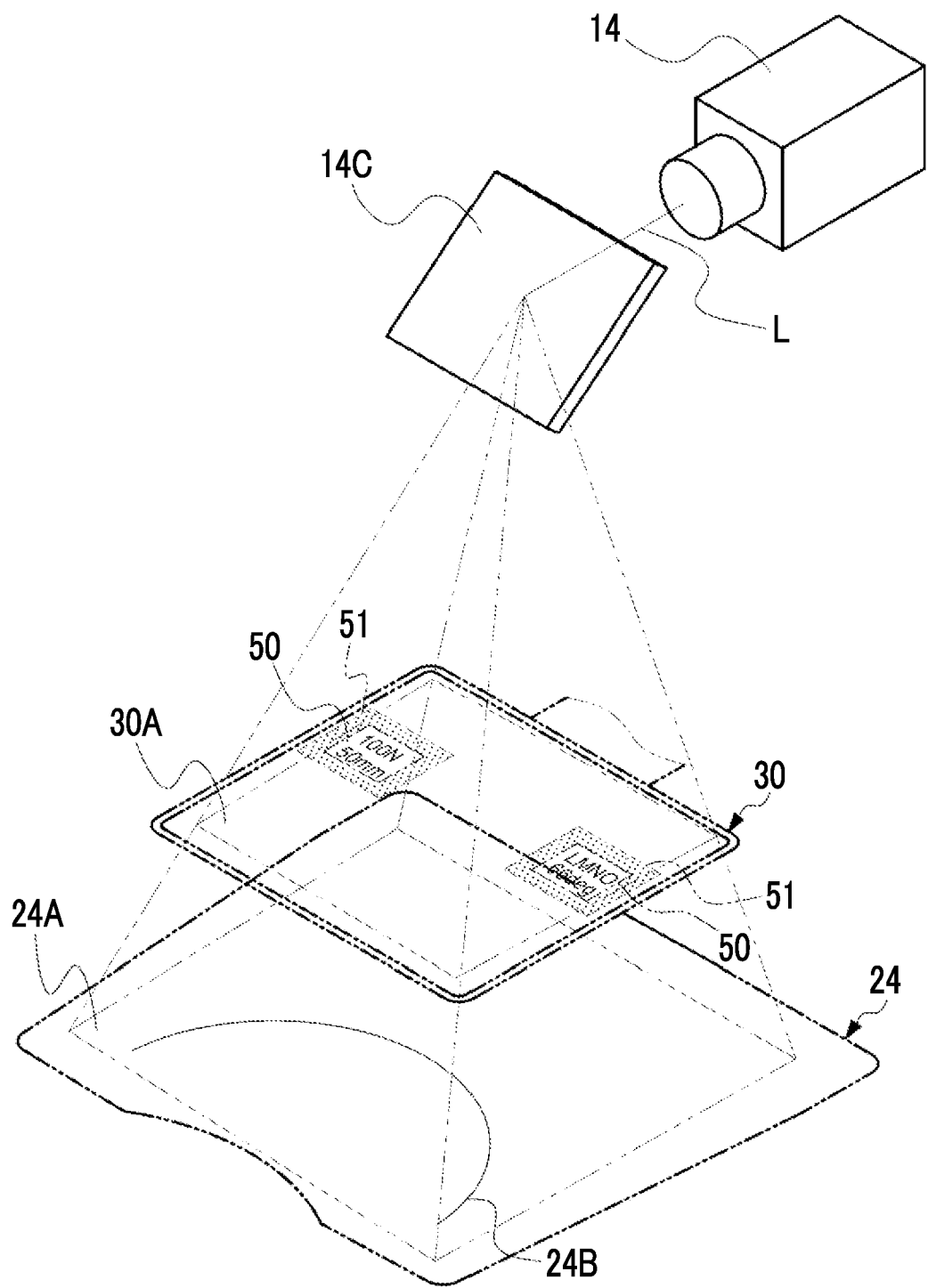
FIG. 6 is a schematic view showing an example of the projection of the image in the mammography apparatus.

As shown in FIGS. 5 and 6, in the mammography apparatus 10, information is projected onto the imaging surface 24A and the bottom plate 30A of the compression plate 30 by emitting the projection light L from the projector 14. The projector 14 can project different information onto each of the imaging surface 24A and the bottom plate 30A of the compression plate 30.

Imaging condition information 50, which is information indicating imaging conditions, is projected onto the bottom plate 30A of the compression plate 30. Examples of the imaging condition include a current compression pressure, compression thickness t, or type of imaging technique for the breast M. The compression pressure is obtained, for example, by measuring a reaction force applied to the compression plate 30 in a case where the breast M is compressed by the compression plate 30 with a pressure measuring device (not shown). The pressure measuring device is provided, for example, on the imaging table 24. The compression thickness t is obtained by measuring a height of the compression plate 30 with respect to the imaging surface 24A in a state in which the breast M is compressed. The height of the compression plate 30 is measured, for example, based on the movement amount of the compression plate 30 which is detected by the encoder 35C. Examples of the imaging technique include cranio-caudal (CC) imaging in which the breast M is compressed from a cranio-caudal direction of the subject F and imaged, medio-lateral (MLO) imaging in which the breast M is compressed from a direction inclined with respect to the cranio-caudal direction of the subject F and imaged, and the like. For example, the imaging technique is input in advance by an operator. In addition, examples of other imaging conditions include past imaging conditions (compression pressure, compression thickness t, type of imaging technique, and the like). Furthermore, other imaging conditions include information that can identify the subject F (for example, a name, gender, age, identification (ID) of the subject F), or the like. Furthermore, other imaging conditions include information related to mammography examination (an examination date and time, an examination performer, a radiation irradiation time, an output or tube voltage of a radiation source during radiation irradiation, or the like).

The imaging condition information 50 is an example of "information" according to the technology of the present disclosure.

In the bottom plate 30A of the compression plate 30, a region 51 onto which the imaging condition information 50 is projected is subjected to a process of suppressing transmission of light. In an example shown in FIG. 6, the region 51 onto which the imaging condition information 50 is projected is subjected to a roughening treatment. As a result, the projection light L representing the imaging condition information 50 is less likely to transmit through the compression plate 30, and an amount of reflected light on the compression plate 30 increases. Accordingly, the imaging condition information 50 is clearly visible on the compression plate 30. Here, examples of the roughening treatment include blasting. In addition, as another example of the processing for suppressing the transmission of light, a member that is opaque to the projection light L may be attached to the region 51 of the compression plate 30 onto which the imaging condition information 50 is projected. For example, an aspect in which a seal is attached to the region 51 of the compression plate 30 may be employed.

Portions of the compression plate 30 other than the region 51 are made of a material transparent to the projection light L. Therefore, the projection light L transmitted through the compression plate 30 is projected onto the imaging surface 24A. A skin line 24B indicating a contour of the breast M, which is an index for placing the breast M, is projected onto the imaging surface 24A. The contour of the breast M indicated by the skin line 24B is obtained by extracting the contour of the breast M from an examination image captured in the past examination. Since a relative positional relationship between the imaging surface 24A and a detection surface of the radiation detector 26 is known, a projection position of the skin line 24B to be projected onto the imaging surface 24A can be derived from a position of the skin line appearing in the examination image detected by the radiation detector 26. By displaying the skin line 24B obtained in the past examination in this way, it is possible to image the breast M at the same position as that of the past examination, which is effective in performing follow-up observation or the like.

The breast M of the subject F is positioned on the imaging surface 24A of the imaging table 24 by the user. The breast M is compressed by the compression plate 30 in a state in which the breast M is positioned. Then, as shown in FIGS. 5 and 6, the imaging condition information 50 is projected onto the compression plate 30, and the skin line 24B is projected onto the imaging surface 24A. In addition, instead of the skin line 24B or together with the skin line 24B, a mark indicating a position of a papilla of the breast M (for example, a mark of a cross having an intersection at the position of the papilla) may be projected onto the imaging surface 24A.

For example, a projection magnification of the projection optical system 14D is set such that an image having the maximum size that can be displayed on the image display surface 14A1 falls within a range of the imaging surface 24A. Therefore, among pieces of information displayed on the image display surface 14A1, all of pieces of information carried by the projection light L that reaches the imaging surface 24A are projected onto the imaging surface 24A.

Here, the compression plate 30 moves in the up-down direction (a direction along a Z direction shown in FIG. 5). Accordingly, a distance between the compression plate 30 and the projector 14 changes. Therefore, even in a case where the projection magnification of the projection optical system 14D is fixed, a projection distance of an image from the projector 14 to the compression plate 30 changes, so that a projectable range R (see FIG. 10) in the compression plate 30 changes. More specifically, a display size of the imaging condition information 50 on the compression plate 30 changes. For example, the display size of the imaging condition information 50 is the smallest on a side where the compression plate 30 is closest to the projector 14, and the display size of the imaging condition information 50 increases as a distance from the projector 14 increases. Then, the display size of the imaging condition information 50 is maximized at a position farthest from the projector 14. In addition, a display position in the compression plate 30 may change due to a change in the display size depending on a direction in which a luminous flux of the projection light L is incident on the compression plate 30. In this way, at least one of the display size or the display position of the imaging condition information 50 changes by the movement of the compression plate 30. Therefore, the imaging condition information 50 may extend beyond the compression plate 30, or the imaging condition information 50 may be too small to decipher the contents. As a result, a visibility of the imaging condition information 50 by the user is reduced.

On the other hand, on the imaging surface 24A, since the projection distance from the projector 14 is constant, a display size of the skin line 24B projected from the projector 14 does not change. Further, as described above, the focus of the projection optical system 14D of the projector 14 is also adjusted in advance in accordance with a distance to the imaging surface 24A. For example, the focus of the projection optical system 14D is optically set based on the arrangement of the optical elements of the projection optical system 14D, the distance between the imaging surface 24A and the projector 14, and the like. For example, the focus of the projection optical system 14D is adjusted within a range between the imaging surface 24A and a position close to the projector 14 from the imaging surface 24A by a statistically determined thickness t of the breast M. Here, the statistically determined thickness t of the breast M is, for example, an average value of thicknesses t of the breasts M of a plurality of subjects F, but this is only an example. For example, the statistically determined thickness t of the breast M may be a mode value or a median value of the thicknesses t of the breasts M of a plurality of subjects F. In this example, the focus of the projection optical system 14D is on the imaging surface 24A.

As described above, in the mammography apparatus 10, the imaging condition information 50 is projected onto the compression plate 30 where a projection distance from the projector 14 changes, and the skin line 24B is projected onto the imaging surface 24A where the projection distance does not change.

Therefore, as shown in FIG. 6, the processor 16A controls the display 14A of one projector 14 to realize appropriate projection on two surfaces having different projection distances such that the skin line 24B is projected onto the imaging surface 24A and the imaging condition information 50 is projected onto the bottom plate 30A of the compression plate 30. First, information displayed on the display 14A of the projector 14 is an image 52 including the imaging condition information 50 and the skin line 24B (see FIGS. 6, 9, and 11). Then, the processor 16A controls the display 14A to change the display size and the display position of the imaging condition information 50 of the image 52 on the image display surface 14A1 in accordance with the movement of the compression plate 30 independently of the display size and the display position of the skin line 24B. In addition, the processor 16A sets in advance the display size and the display position of the skin line 24B of the image 52 on the image display surface 14A1 of the display 14A. The image 52 is an example of an "image" according to the technology of the present disclosure.

Figure 7:
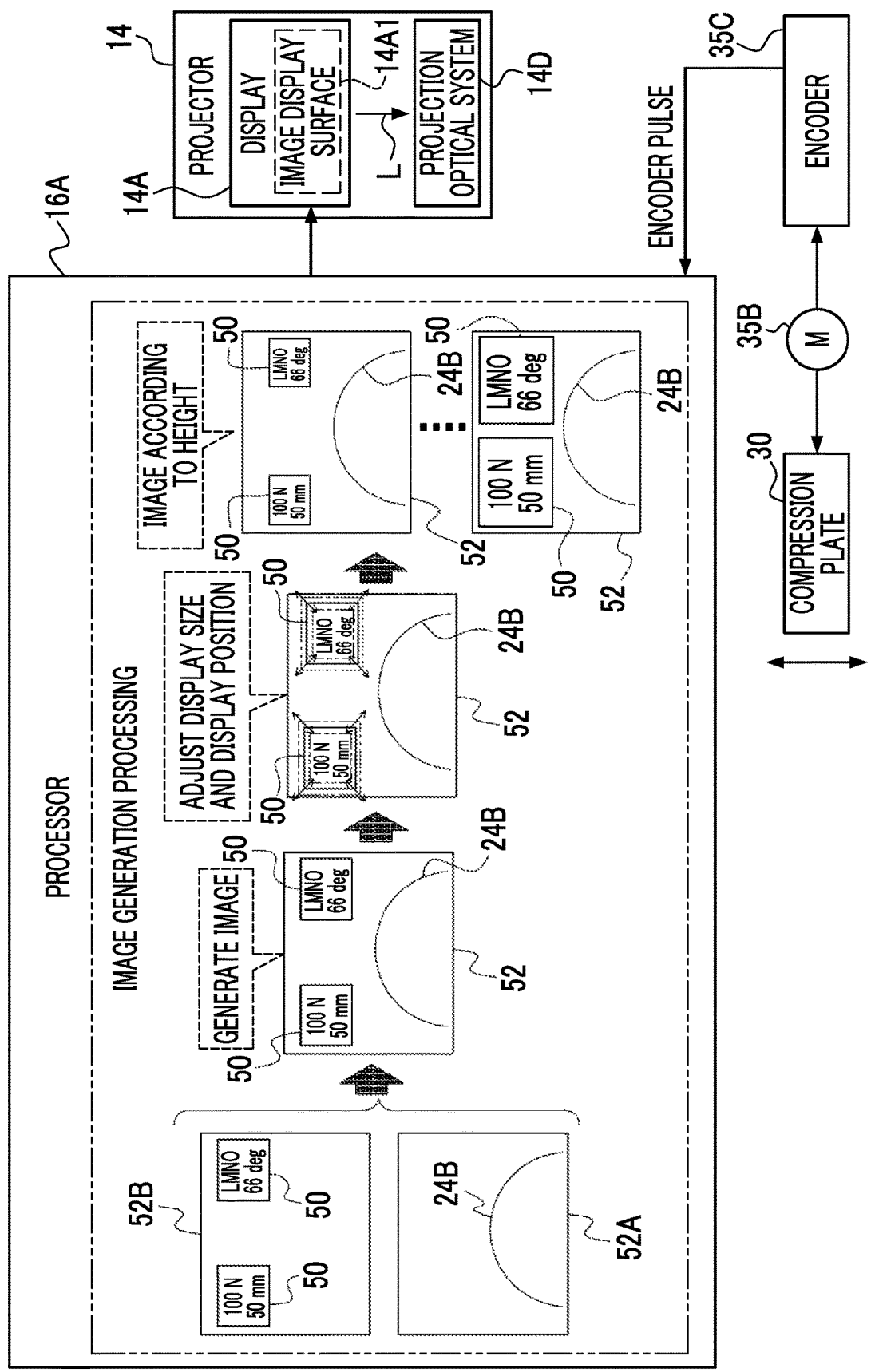
FIG. 7 is a functional block diagram showing an example of image generation processing in a processor.

As shown in FIG. 7, the processor 16A executes image generation processing for generating the image 52 to be displayed on the display 14A. First, the processor 16A acquires the imaging condition information 50 in the image 52. For example, the processor 16A acquires the compression thickness t, the compression force, and the like of the imaging condition information 50 from a measurement value of the pressure measuring device and the height of the compression plate 30. In addition, the processor 16A acquires the imaging technique from input information of the operator. In addition, the processor 16A acquires information about the skin line 24B (coordinate information representing a shape and a position of the skin line 24B) derived from the examination image of the breast M imaged in the past. Then, based on the acquired imaging condition information 50 and skin line 24B, the processor 16A generates images 52A and 52B representing the imaging condition information 50 and the skin line 24B. Then, the processor 16A combines the two images 52A and 52B to generate the image 52 including the imaging condition information 50 and the skin line 24B.

Further, the processor 16A adjusts the display size and the display position of the imaging condition information 50 in the generated image 52 in accordance with the position of the compression plate 30 and the projectable range R on the compression plate 30. On the other hand, since the projection distance to the imaging surface 24A is fixed, in the image 52, the adjustment of the display size and the display position according to the position of the compression plate 30 is not performed for the skin line 24B to be projected onto the imaging surface 24A. That is, the processor 16A adjusts the display size and the display position for the imaging condition information 50 independently of the adjustment for the display size and the display position of the skin line 24B in the image 52.

As described above, the processor 16A detects the movement amount of the compression plate 30 by counting the encoder pulse from the encoder 35C (see FIG. 4) of the drive mechanism 35. Then, the position of the compression plate 30 is obtained in accordance with the detected movement amount. The processor 16A adjusts the display size and the display position of the imaging condition information 50 in the image 52 based on the position of the compression plate 30. In this way, the image 52 according to the position of the compression plate 30 (that is, a height h from the imaging surface 24A) is generated. In FIG. 7, the image 52 according to the height generated by the image generation processing shows how the display position and the display size of the imaging condition information 50 change in accordance with the position of the compression plate 30.

The processor 16A outputs a signal indicating the image 52 according to the position of the compression plate 30 to the display 14A of the projector 14. The display 14A displays the image 52 on the image display surface 14A1 based on the signal acquired from the processor 16A. Then, the projector 14 emits the projection light L indicating the image 52 via the projection optical system 14D. In this way, the display size and the display position of the imaging condition information 50 are adjusted in accordance with the position of the compression plate 30.

Figure 8:
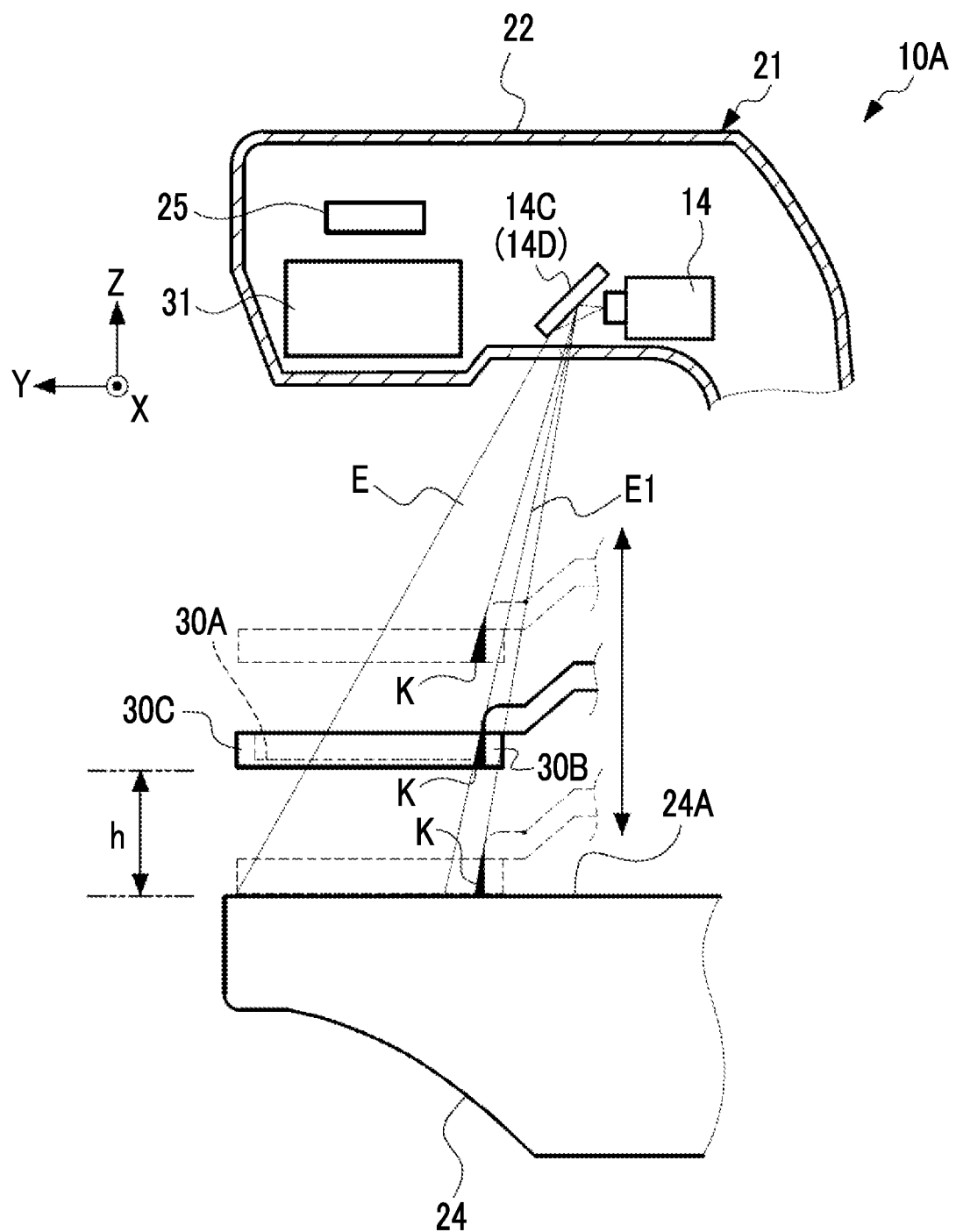
FIG. 8 is a side view showing an example of the projection of the image in a mammography apparatus according to a comparative example.

Here, as shown in FIG. 8, a mammography apparatus 10A of a comparative example will be considered. As described above, the radiation source 25 and the irradiation field limiter 31 are accommodated in the radiation source accommodation portion 22. In the mammography apparatus 10A, in order to avoid interference between the radiation source 25 and the irradiation field limiter 31, the projector 14 is disposed on the stand 20 side with respect to the radiation source 25 and the irradiation field limiter 31 in the horizontal direction (a direction along the Y direction shown in FIG. 8). That is, the projector 14 is disposed on the rear side with respect to the radiation source 25 and the irradiation field limiter 31. As a result, since the projector 14 is out of a radiation irradiation range, it is possible to suppress blocking of the radiation by the projector 14 during imaging of the breast M.

However, disposing the projector 14 on the stand 20 side (that is, the rear side) means that an emission point of the projection light L emitted from the projector 14 also moves rearward. As described above, the compression plate 30 has a box shape, and the compression plate 30 comprises the rear end wall 30B. Therefore, a part of an effective luminous flux E of the projection light L emitted from the projector 14 may be blocked by the rear end wall 30B. That is, since the projection light L spreads from the emission point with a certain spread angle, the rear end wall 30B may fall within a range of the effective luminous flux E in a case where the compression plate 30 is viewed sideways (that is, a case where the compression plate 30 is viewed in a direction along the X direction shown in FIG. 8). Here, the effective luminous flux E refers to a luminous flux including information about the image 52 to be projected among luminous fluxes emitted by the projector 14. The effective luminous flux E is an example of an "effective luminous flux" according to the technology of the present disclosure.

Further, in the mammography apparatus 10, the compression plate 30 moves in the up-down direction (a direction along the Z direction shown in FIG. 8). As a result, since the distance between the compression plate 30 and the projector 14 changes, a part of the effective luminous flux E is likely to be blocked by the rear end wall 30B of the compression plate 30. That is, in a case where the compression plate 30 moves toward the projector 14, the rear end wall 30B is likely to fall within the range of the effective luminous flux E.

Figure 9:
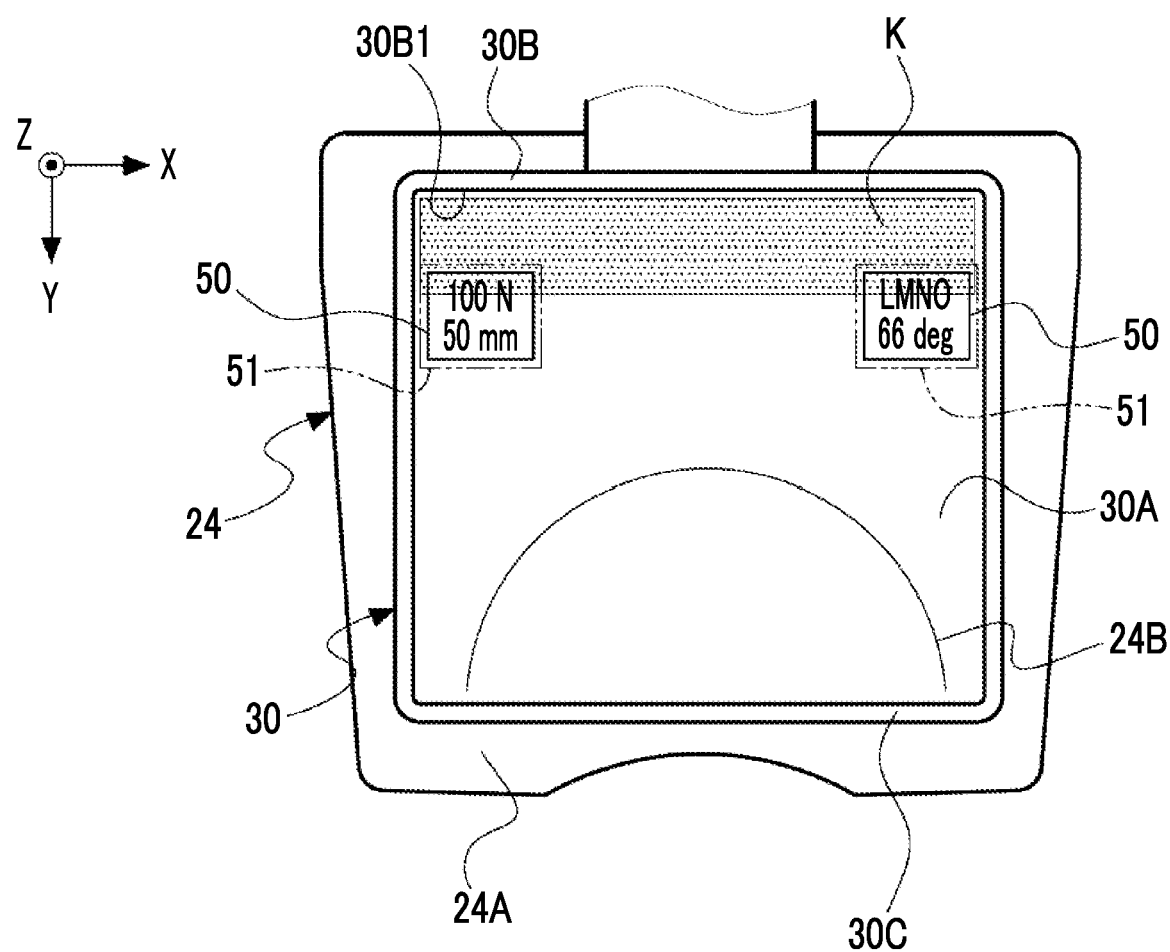
FIG. 9 is a plan view showing an example of a projected image in the mammography apparatus.

As shown in FIG. 9, in a case where a part of the effective luminous flux E is blocked by the rear end wall 30B, a part of the image 52 projected onto the compression plate 30 is missing (so-called vignetting K occurs). For this reason, the visibility of the imaging condition information 50 may deteriorate, for example, it may be difficult to decipher the imaging condition information 50 projected onto the compression plate 30. In FIG. 9, the vignetting K is schematically shown by hatching, but in reality, in a case where the vignetting K occurs, a part of the imaging condition information 50 is missing.

Therefore, in the mammography apparatus 10 according to the present embodiment, the optical element closest to the compression plate 30 in the projection optical system 14D of the projector 14 is disposed in front of the imaginary intersection C. The imaginary intersection C is an intersection between an imaginary plane A formed by extending a front surface 30B1 of the rear end wall 30B and an imaginary horizontal line B crossing the projector 14 in the horizontal direction.

Figure 10:
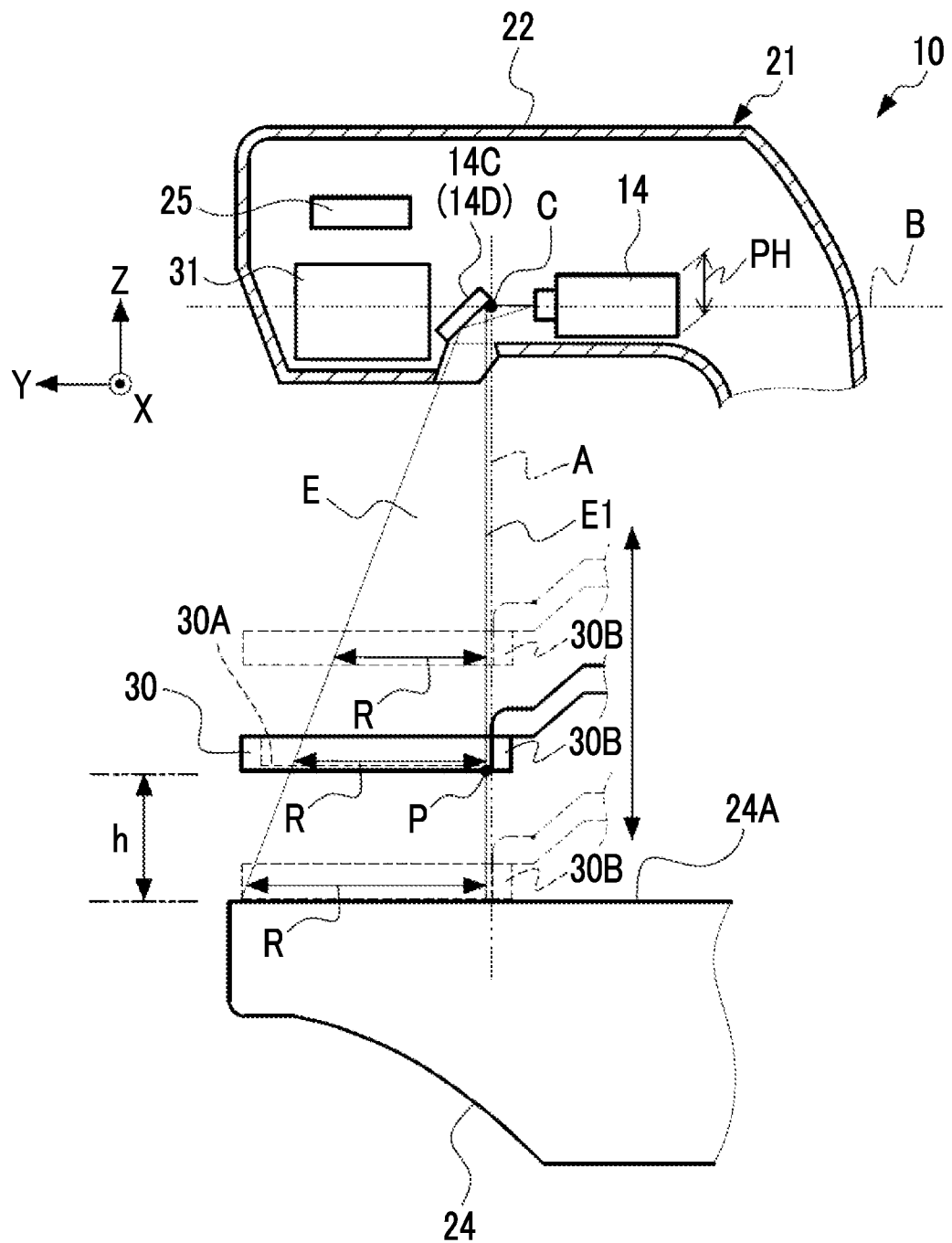
FIG. 10 is a side view showing an example of the projection of the image in the mammography apparatus.
Figure 11:
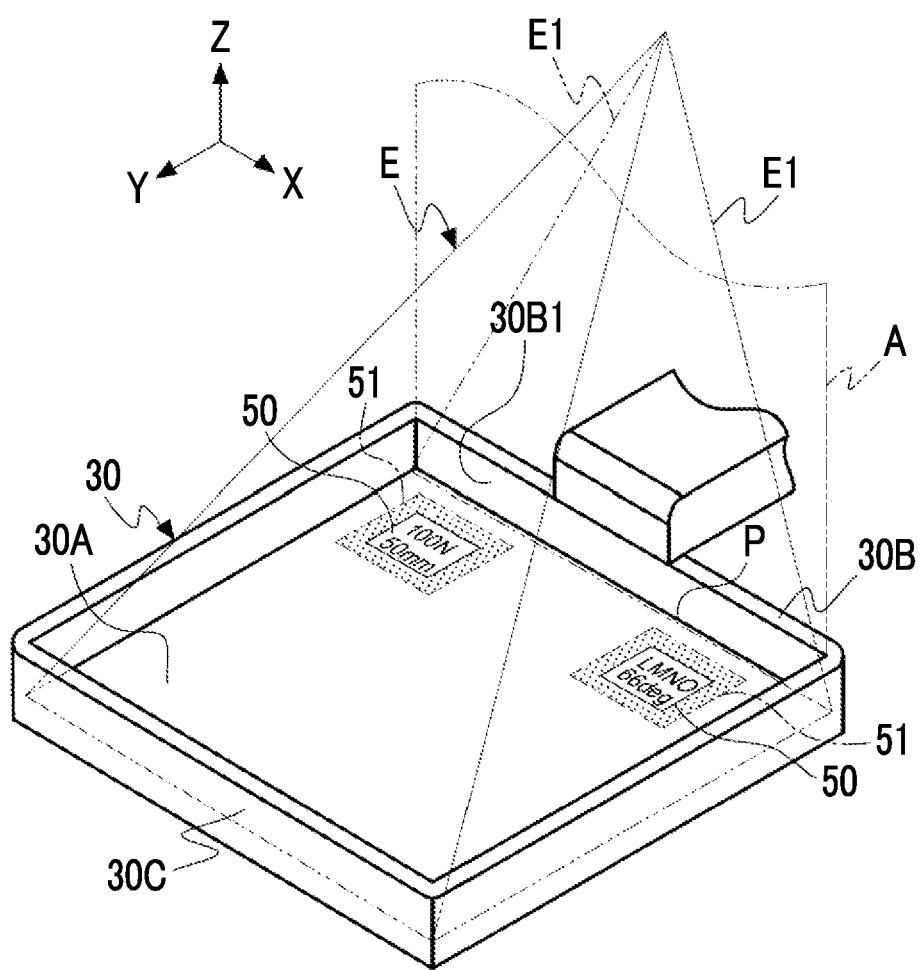
FIG. 11 is an external perspective view showing an example of the projection of the image on a compression plate.

As shown in FIGS. 10 and 11, the projection optical system 14D of the projector 14 includes the minor 14C. The projection light L is reflected by the mirror 14C and then emitted toward the compression plate 30 and the imaging table 24. In other words, the mirror 14C is disposed closest to the compression plate 30 on an optical path of the projection light L of the projection optical system 14D. The mirror 14C is an example of an "optical element closest to the compression plate" according to the technology of the present disclosure.

As described above, the compression plate 30 comprises the rear end wall 30B. The rear end wall 30B is a wall that rises upward in the vertical direction (that is, in the Z direction shown in FIG. 10) at a rear end of the compression plate 30. In other words, in the mammography apparatus 10, the rear end wall 30B rises toward the radiation source 25. The rear end wall 30B has a front surface 30B1 which is a surface on the front side (that is, a surface on the subject F side). The front surface 30B1 is parallel to a normal direction of the bottom plate 30A. In the present embodiment, "parallel" refers not only to perfect parallel but also to parallel in the sense of including an error that is generally acceptable in the technical field to which the technology of the present disclosure belongs and that does not contradict the concept of the technology of the present disclosure. The front surface 30B1 is an example of an "inner wall surface" according to the technology of the present disclosure.

The imaginary plane A is a plane formed by imaginarily extending the front surface 30B1 upward in the rear end wall 30B of the compression plate 30. Therefore, the imaginary plane A is also parallel to the normal direction of the bottom plate 30A. The normal direction of the bottom plate 30A is, for example, a vertical direction. The imaginary plane A is an example of an "imaginary plane" according to the technology of the present disclosure.

The imaginary horizontal line B is an imaginary horizontal line crossing the projector 14 (that is, a straight line along the horizontal direction) in the horizontal direction (that is, a direction along the Y direction shown in FIG. 10). Here, crossing the projector 14 refers to intersecting the projector 14 within a range of a height PH of the projector 14 (that is, a distance in a direction along the Z direction shown in FIG. 10). The imaginary intersection C is an imaginary intersection between the imaginary plane A and the imaginary horizontal line B. The imaginary horizontal line B is an example of an "imaginary horizontal line" according to the technology of the present disclosure. Further, the imaginary intersection C is an example of an "imaginary intersection" according to the technology of the present disclosure.

The mirror 14C is disposed in front of the imaginary intersection C. That is, the mirror 14C is disposed on the subject F side with respect to the imaginary intersection C. Here, the fact that the mirror 14C is disposed in front of the imaginary intersection C means that a portion of the minor 14C that is used for the reflection of the projection light L (for example, a part of a mirror surface) is disposed in front of the imaginary intersection C. By disposing the minor 14C in front of the imaginary intersection C, the emission point of the projection light L is located in front of the rear end wall 30B.

Here, a movement direction of the compression plate 30 is along the normal direction of the bottom plate 30A. Further, the front surface 30B1 of the rear end wall 30B is also parallel to the normal direction of the bottom plate 30A. That is, the movement direction of the compression plate 30 and the front surface 30B1 of the rear end wall 30B are parallel to each other. Further, in a case where the compression plate 30 is viewed sideways (that is, a case where the compression plate 30 is viewed in a direction along the X direction shown in FIG. 10), a light beam E1 located at a rear end of the effective luminous flux E is parallel to the movement direction of the compression plate 30. The light beam E1 located at the rear end of the effective luminous flux E is most likely to be blocked by the rear end wall 30B among light beams included in the effective luminous flux E. Since the light beam E1 located at the rear end of the effective luminous flux E is parallel to the movement direction of the compression plate 30, even in a case where the compression plate 30 moves, it is suppressed that the light beam E1 located at the rear end of the effective luminous flux E is blocked by the rear end wall 30B. That is, the light beam E1 is emitted toward the compression plate 30 along the normal direction of the bottom plate 30A, and the front surface 30B1 of the rear end wall 30B is also along the normal direction of the bottom plate 30A. Therefore, it is suppressed that the front surface 30B1 of the rear end wall 30B hinders propagation of the light beam E1.

As described above, by emitting the projection light L toward the compression plate 30, the imaging condition information 50 in the image 52 is projected onto the bottom plate 30A of the compression plate 30. As shown in FIG. 11, a position P on the front side where the rear end wall 30B rises coincides with a projection position of the light beam E1 located at the rear end of the effective luminous flux E. In other words, the position P on the front side where the rear end wall 30B rises coincides with a rear end of the image 52. In the present embodiment, "coinciding" refers not only to perfect coinciding but also to coinciding in the sense of including an error that is generally acceptable in the technical field to which the technology of the present disclosure belongs and that does not contradict the concept of the technology of the present disclosure.

The light beam E1 is emitted to the compression plate 30 along the normal direction of the bottom plate 30A of the compression plate 30. The compression plate 30 also moves along the normal direction of the bottom plate 30A. Therefore, the compression plate 30 can move in a state in which the position P and the projection position of the light beam E1 coincide with each other. Therefore, even in a case where the compression plate 30 moves, it is suppressed that a part of the effective luminous flux E is blocked by the rear end wall 30B. Furthermore, the fact that the position P and the projection position of the light beam E1 coincide with each other means that the projectable range R of the image 52 indicated by the effective luminous flux E is extended up to a rear end side of the bottom plate 30A as much as possible.

In other words, in a case where the compression plate 30 is located close to the projector 14, the projectable range R of the image 52 is located in front of the rear end wall 30B in the bottom plate 30A of the compression plate 30. As described above, the projectable range R of the image 52 indicated by the effective luminous flux E is extended up to the rear end side of the bottom plate 30A as much as possible.

Then, the user lowers the compression plate 30 in the mammography apparatus 10 while checking the imaging condition information 50 displayed on the bottom plate 30A of the compression plate 30 to compress the positioned breast M.

As described above, in the mammography apparatus 10 according to the present embodiment, the minor 14C, which is the optical element closest to the compression plate 30 in the projector 14, is disposed in front of the imaginary intersection C between the imaginary plane A formed by extending the front surface 30B1 of the rear end wall 30B of the compression plate 30 toward the projector 14, and the imaginary horizontal line B crossing the projector 14 in the horizontal direction. The fact that the minor 14C, which is the optical element closest to the compression plate 30, is disposed in front of the imaginary intersection C means that the emission point of the light emitted from the projector 14 is located in front of the front surface 30B1 of the rear end wall 30B of the compression plate 30. As a result, as compared to a case where the mirror 14C, which is the optical element closest to the compression plate 30, is disposed behind the imaginary intersection C, it is suppressed that the light beam E1 on the rear side in the effective luminous flux E of the light emitted from the projector 14 is blocked by the rear end wall 30B of the compression plate 30. That is, vignetting in the effective luminous flux E of the light emitted from the projector 14 is suppressed.

Further, in the mammography apparatus 10 according to the present embodiment, the front surface 30B1 of the rear end wall 30B of the compression plate 30 is parallel to the movement direction of the compression plate 30, and the light beam E1 located at the rear end of the effective luminous flux E is parallel to the movement direction of the compression plate 30. That is, the front surface 30B1 of the rear end wall 30B, the movement direction of the compression plate 30, and the light beam E1 located at the rear end of the effective luminous flux E are all parallel to each other. Therefore, compared to a case where the movement direction of the compression plate 30 is not parallel to the front surface 30B1 of the rear end wall 30B or the light beam E1 located at the rear end of the effective luminous flux E, vignetting of the effective luminous flux is suppressed regardless of the position of the compression plate 30 in the movement direction.

In addition, in the mammography apparatus 10 according to the present embodiment, in the bottom plate 30A onto which the image 52 is projected in the compression plate 30, the position P on the front side where the rear end wall 30B rises and the projection position of the light beam E1 located at the rear end of the effective luminous flux E coincide with each other. Compared to a case where the projection position of the light beam E1 located at the rear end of the effective luminous flux E is located in front of the position P on the front side where the rear end wall 30B rises, the projectable range R of the image 52 can be extended to the rear end side as much as possible.

Further, in the mammography apparatus 10 according to the present embodiment, in a case where the compression plate 30 is located closest to the projector 14, the projectable range R of the image 52 on the bottom plate 30A of the compression plate 30 is located in front of the rear end wall 30B. Accordingly, the projectable range R of the image 52 can be extended to the rear end side as much as possible.

In addition, in the mammography apparatus 10 according to the present embodiment, since the front surface 30B1 of the rear end wall 30B is parallel to the normal direction of the bottom plate 30A of the compression plate 30 (for example, the vertical direction), the compression plate 30 may be easier to use compared to a case where the rear end wall 30B is inclined.

In addition, in the mammography apparatus 10 according to the present embodiment, the image 52 includes the imaging condition information 50 which is information indicating an imaging condition for imaging the breast M, and on the compression plate 30, the region 51 onto which the imaging condition information 50 is projected is subjected to light transmission suppression processing for suppressing transmission of light. Accordingly, the visibility of the imaging condition information 50 projected onto the bottom plate 30A of the compression plate 30 is improved as compared to a case where the light transmission suppression processing is not performed on the compression plate 30.

First Modification Example

The first embodiment has been described with an example of a form in which, in the projection optical system 14D, the optical element provided closest to the compression plate 30 is the mirror 14C, but the technology of the present disclosure is not limited thereto. In the projection optical system 14D, the optical element provided closest to the compression plate 30 may be a part other than the minor 14C.

Figure 12:
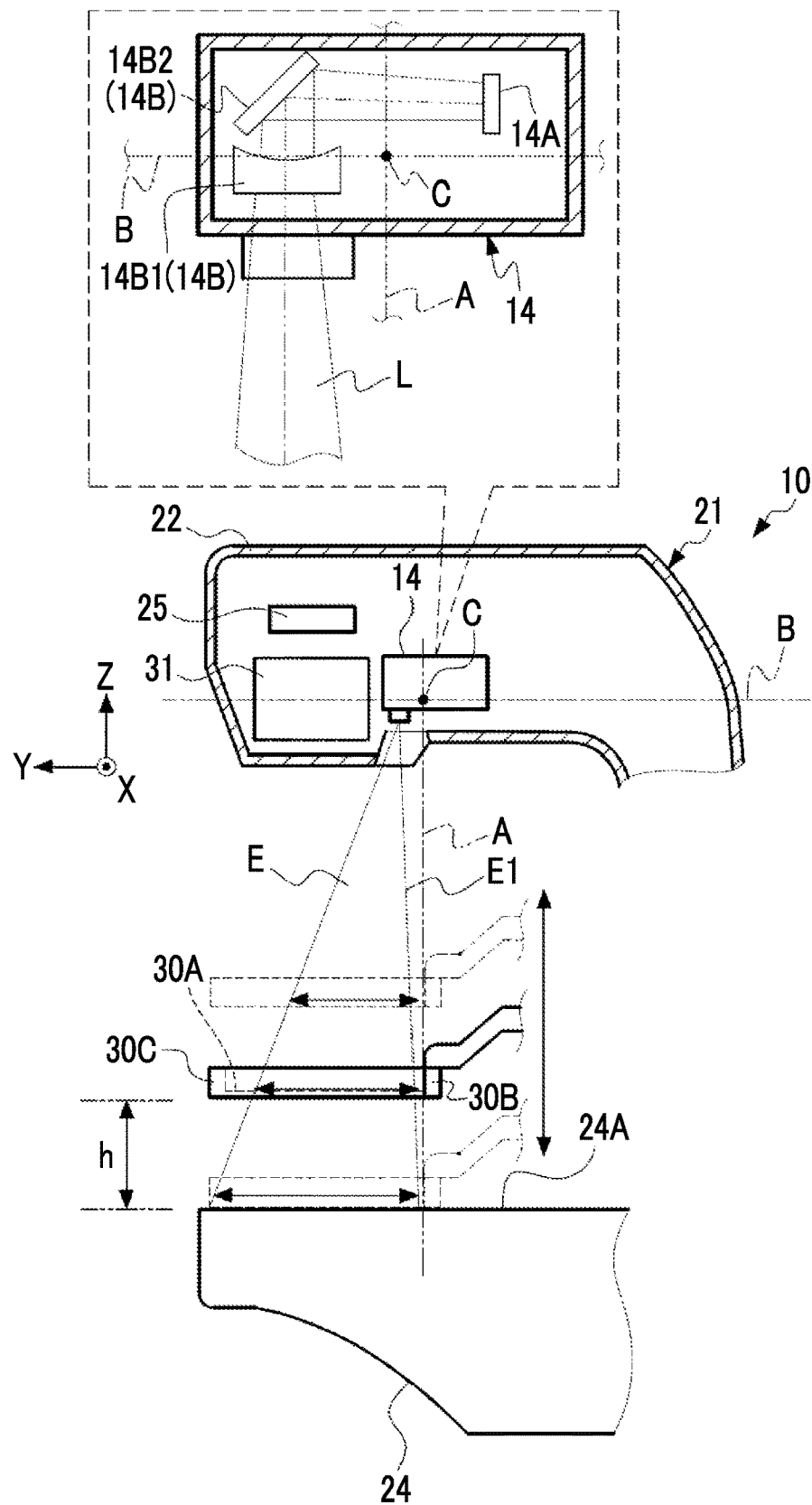
FIG. 12 is a side view showing an example of the projection of the image in the mammography apparatus.

As shown in FIG. 12, the projector 14 has the built-in optical system 14B. The built-in optical system 14B comprises a lens 14B1 and a mirror 14B2. The projection light L emitted from the display 14A is reflected by the mirror 14B2 and then emitted from the lens 14B1 toward the compression plate 30. That is, in the projection optical system 14D, the optical element provided closest to the compression plate 30 on the optical path of the projection light L is the lens 14B1. In the present modification example, the built-in optical system is an example of "a plurality of optical elements" according to the technology of the present disclosure. The lens 14B1 is an example of "an optical element provided closest to the compression plate" according to the technology of the present disclosure.

The imaginary plane A is a plane formed by imaginarily extending the front surface 30B1 in the rear end wall 30B of the compression plate 30. Further, the imaginary horizontal line B is an imaginary straight line that crosses the projector 14 in the horizontal direction. The imaginary intersection C is an imaginary intersection between the imaginary plane A and the imaginary horizontal line B. The lens 14B1 is disposed in front of the imaginary intersection C. By disposing the lens 14B1 in front of the imaginary intersection C, the emission point of the projection light L is located in front of the rear end wall 30B.

As described above, in the mammography apparatus 10 according to the first modification example, the lens 14B1, which is the optical element closest to the compression plate 30 in the projector 14, is disposed in front of the imaginary intersection C between the imaginary plane A formed by extending the front surface 30 B1 of the rear end wall 30 B of the compression plate 30 toward the projector 14 and the imaginary horizontal line B crossing the projector 14 in the horizontal direction. As a result, as compared with a case where the lens 14B1, which is the optical element closest to the compression plate 30, is disposed behind the imaginary intersection C, it is suppressed that the light beam E1 on the rear side in the effective luminous flux E of the light emitted from the projector 14 is blocked by the rear end wall 30B of the plate 30. That is, vignetting in the effective luminous flux E of the light emitted from the projector 14 is suppressed.

Second Modification Example

The first embodiment has been described with an example of a form in which the light beam E1 located at the rear end of the effective luminous flux E is parallel to the movement direction of the compression plate 30, but the technology of the present disclosure is not limited thereto. In the second modification example, the light beam E1 located at the rear end of the effective luminous flux E is not parallel to the movement direction of the compression plate 30.

Figure 13:
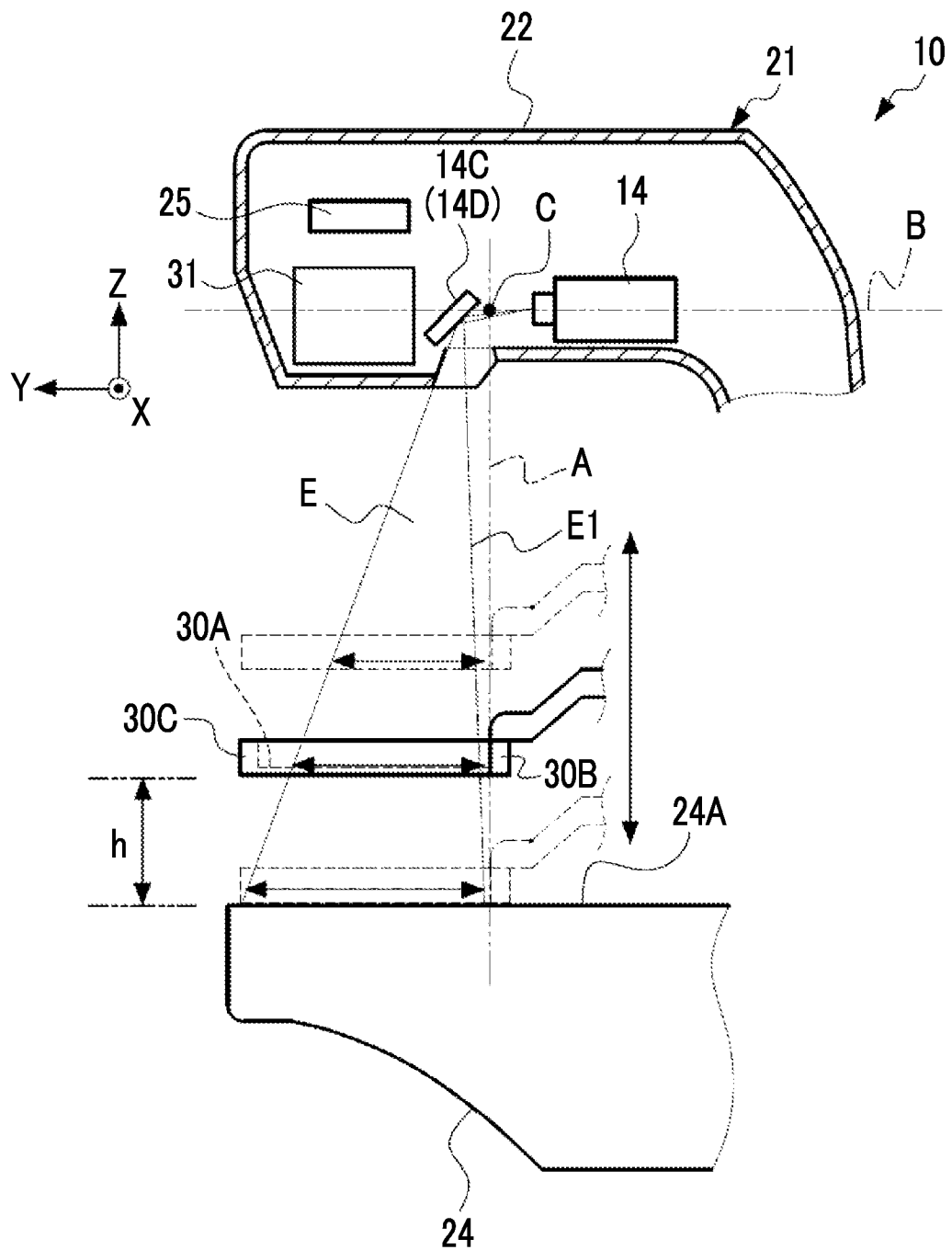
FIG. 13 is a side view showing an example of the projection of the image in the mammography apparatus.

As shown in FIG. 13, the projection light L is reflected by the mirror 14C and then emitted toward the compression plate 30 and the imaging table 24. Here, in a case where the compression plate 30 is viewed sideways (that is, a case where the compression plate 30 is viewed in a direction along the X direction shown in FIG. 13), the light beam E1 located at the rear end of the effective luminous flux E is not parallel to the movement direction of the compression plate 30. That is, the movement direction of the compression plate 30 is the normal direction of the bottom plate 30A (a direction along the Z direction shown in FIG. 13), and in a case where the compression plate 30 is viewed sideways, a propagation direction of the light beam E1 is inclined with respect to the normal direction of the bottom plate 30A. That is, the emission point of the light beam E1 is located on the front side with respect to the projection position.

As described above, by disposing the minor 14C in front of the imaginary intersection C, the emission point of the effective luminous flux E is located in front of the rear end wall 30B. Therefore, even in a case where the compression plate 30 moves, it is suppressed that the light beam E1 located at the rear end of the effective luminous flux E is blocked by the rear end wall 30B.

Second Embodiment

The first embodiment has been described with an example of a form in which the rear end wall 30B is along the normal direction of the bottom plate 30A, but the technology of the present disclosure is not limited thereto. In the second embodiment, a front surface 30D1 of a rear end wall 30D is inclined rearward.

Figure 14:
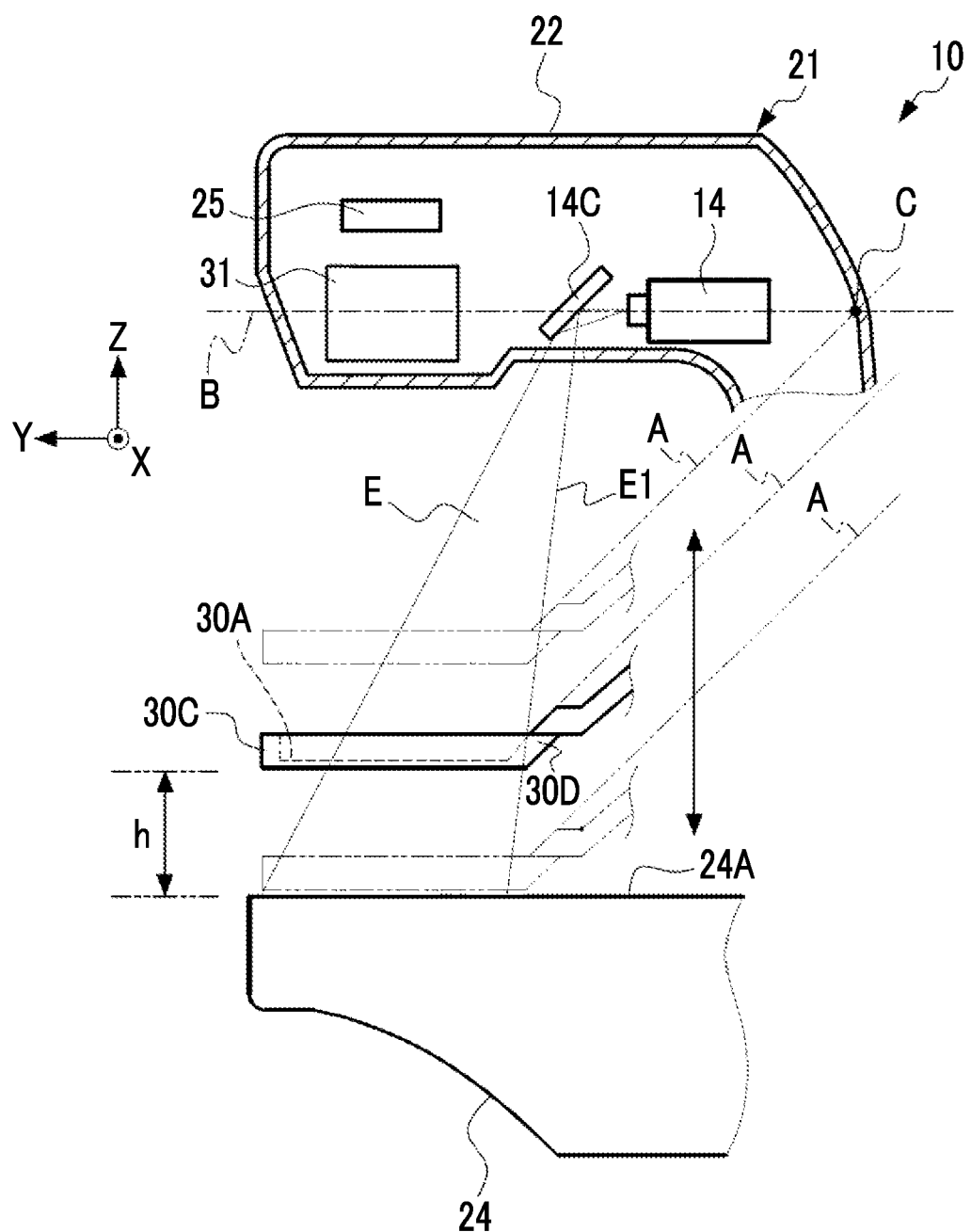
FIG. 14 is a side view showing an example of the projection of the image in the mammography apparatus.
Figure 15:
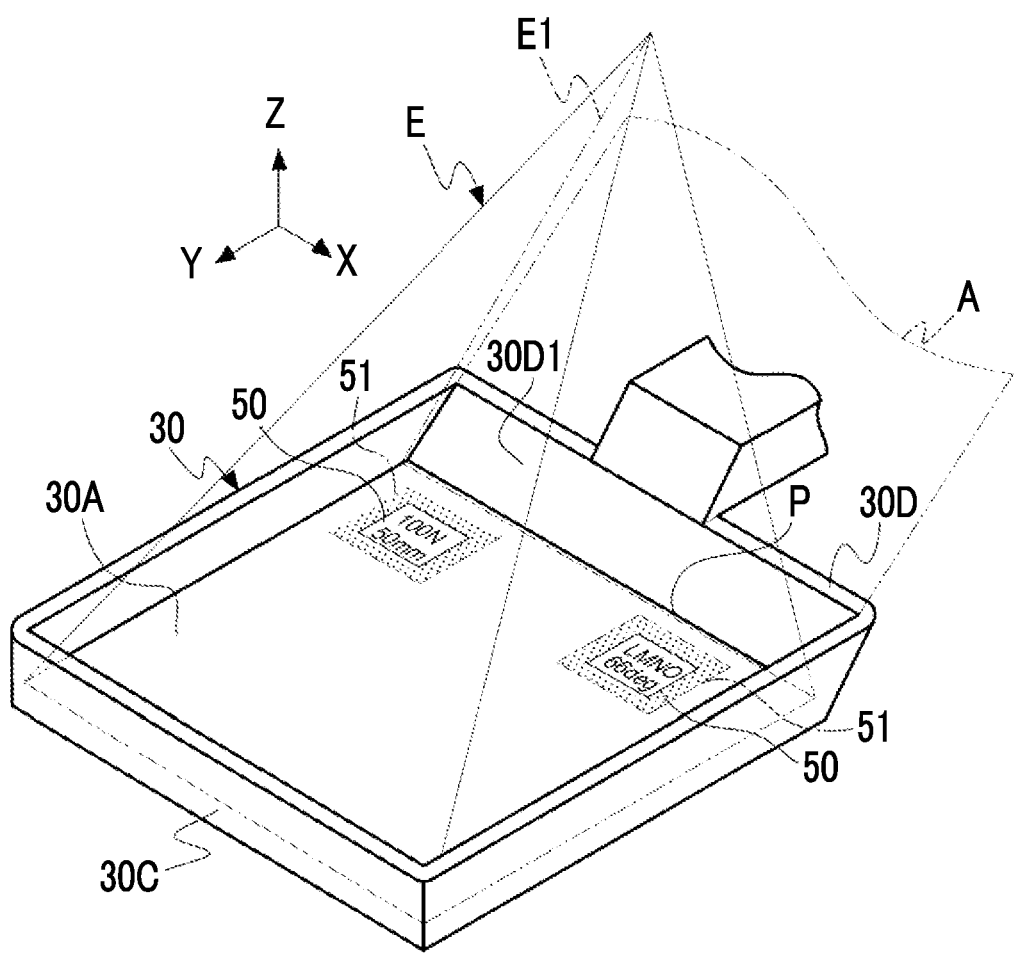
FIG. 15 is an external perspective view showing an example of the projection of the image on the compression plate.

As shown in FIGS. 14 and 15, the compression plate 30 comprises the rear end wall 30D. The rear end wall 30D is a wall that rises upward in the vertical direction (that is, the Z direction shown in FIG. 14) at the rear end of the compression plate 30. An upper end of the front surface 30D1 of the rear end wall 30D is inclined rearward with respect to the normal direction of the bottom plate 30A. The rear end wall 30D is an example of a "stand-side side plate" according to the technology of the present disclosure, and the front surface 30D1 is an example of an "inner wall surface" according to the technology of the present disclosure.

The imaginary plane A is a plane formed by imaginarily extending the front surface 30D1 upward in the rear end wall 30D of the compression plate 30. Therefore, in a side view, the imaginary plane A is also inclined with respect to the normal direction of the bottom plate 30A.

The imaginary horizontal line B is an imaginary straight line crossing the projector 14 in the horizontal direction (that is, a direction along the Y direction shown in FIG. 14). The imaginary intersection C is an imaginary intersection between the imaginary plane A and the imaginary horizontal line B.

The minor 14C is disposed in front of the imaginary intersection C. By disposing the mirror 14C in front of the imaginary intersection C, the emission point of the projection light L is located in front of the rear end wall 30D. Accordingly, it is suppressed that the light beam E1 located at the rear end of the effective luminous flux E is blocked by the rear end wall 30D.

Here, the compression plate 30 is movable along the normal direction of the bottom plate 30A. Therefore, the imaginary plane A also moves in parallel with the movement of the compression plate 30. Accordingly, the position of the imaginary intersection C also changes. In the present embodiment, the fact that the mirror 14C is located in front of the imaginary intersection C means that the mirror 14C is located in front of the imaginary intersection C in a case where the compression plate 30 is located at the highest position (that is, a position where a distance h from the imaging surface 24A is the farthest) among a plurality of the imaginary intersections C.

As described above, in the mammography apparatus 10 according to the second embodiment, the upper end of the front surface 30D1 of the rear end wall 30D is inclined rearward. In addition, the mirror 14C, which is the optical element provided closest to the compression plate 30 in the projection optical system 14D of the projector 14, is located in front of the imaginary intersection C. The imaginary intersection C is an intersection between the imaginary plane A formed by imaginarily extending the front surface 30D1 and the imaginary horizontal line B crossing the projector 14 in the horizontal direction. That is, since the front surface 30D1 is inclined rearward, the position of the imaginary intersection C also moves rearward. Therefore, the projection optical system 14D including the optical element provided closest to the compression plate 30 can be disposed more rearward than a case where the front surface 30D1 of the rear end wall 30D extends along the normal direction of the bottom plate 30A. Accordingly, a degree of freedom in designing the mammography apparatus 10 is improved.

In addition, the above embodiment has been described with an example of a form in which, the imaging condition information 50 is projected onto the compression plate 30, and the skin line 24B is displayed on the imaging surface 24A, but the technology of the present disclosure is not limited thereto. For example, an aspect in which the imaging condition information 50 and the skin line 24B are displayed on the compression plate 30 may be employed. In this case, a region on which the skin line 24B is displayed is also subjected to the light transmission suppression processing in the compression plate 30. However, in this case, since the breast M is difficult to be seen through the compression plate 30, as described in the above-described embodiment, an aspect in which the projection light L is transmitted through the compression plate 30 and the skin line 24B is displayed on the imaging surface 24A is more preferable.

The various processors include a graphics processing unit (GPU) in addition to a CPU. In addition, the various processors are not limited to a general-purpose processor such as a CPU that functions as various processing units by executing software (program), and include a programmable logic device (PLD) which is a processor capable of changing a circuit configuration after manufacture such as a field programmable gate array (FPGA), a dedicated electric circuit which is a processor having a circuit configuration exclusively designed to execute specific processing such as an application specific integrated circuit (ASIC), and the like.

Furthermore, as the hardware structure of the various processors, more specifically, an electric circuitry in which circuit elements such as semiconductor elements are combined can be used.

The above-described contents and illustrated contents are detailed descriptions of parts related to the technology of the present disclosure, and are merely examples of the technology of the present disclosure. For example, the above descriptions related to configurations, functions, operations, and advantages effects are descriptions related to examples of configurations, functions, operations, and advantages effects of the parts related to the technology of the present disclosure. Therefore, it is needless to say that unnecessary parts may be deleted, or new elements may be added or replaced with respect to the above-described contents and illustrated contents within a scope not departing from the spirit of the technology of the present disclosure. In order to avoid complication and easily understand the parts according to the technology of the present disclosure, in the above-described contents and illustrated contents, common technical knowledge and the like that do not need to be described to implement the technology of the present disclosure are not described.

All documents, patent applications, and technical standards described in the present specification are incorporated in the present specification by reference to the same extent as in a case where each document, patent application, and technical standard are specifically and individually noted to be incorporated by reference.

Furthermore, the following appendices will be disclosed in relation to the above-described embodiment.

APPENDIX 1

A mammography apparatus comprising: an imaging table on which a breast of a subject is placed; a radiation source that emits radiation toward the breast; a stand that directly or indirectly supports the radiation source and the imaging table; a compression plate that is disposed to be movable between the imaging table and the radiation source and is directly or indirectly supported by the stand, the compression plate including a bottom plate that compresses the breast and side plates provided on at least two locations of a subject side and a stand side of the bottom plate; and a projector that is disposed on the stand side with respect to the radiation source and projects an image toward the compression plate and the imaging table through a plurality of optical elements, in which in a case where a surface on the subject side in the side plate on the stand side is defined as an inner wall surface of the side plate, and an intersection between an imaginary plane formed by extending the inner wall surface toward the projector and an imaginary horizontal line crossing the projector in a horizontal direction is defined as an imaginary intersection, among the plurality of optical elements, an optical element closest to the compression plate on an optical path of light emitted from the projector and directed to the compression plate is disposed on the subject side with respect to the imaginary intersection.

APPENDIX 2

The mammography apparatus according to appendix 1, in which the inner wall surface is parallel to a movement direction of the compression plate, and a light beam located closest to the stand side in an effective luminous flux emitted from the projector is parallel to the movement direction.

APPENDIX 3

The mammography apparatus according to appendix 1 or 2, in which on a surface of the bottom plate onto which the image is projected, a position where the inner wall surface rises coincides with a projection position of the light beam located closest to the stand side in the effective luminous flux.

APPENDIX 4

The mammography apparatus according to any one of appendices 1 to 3, in which in a case where the compression plate is located closest to the projector, on a surface of the bottom plate onto which the image is projected, a projectable range of the image is located on the subject side with respect to the inner wall surface.

APPENDIX 5

The mammography apparatus according to any one of appendices 1 to 4, in which the inner wall surface is parallel to a normal direction of a surface of the bottom plate onto which the image is projected.

APPENDIX 6

The mammography apparatus according to any one of appendices 1 to 4, in which an upper end of the inner wall surface is inclined toward the stand side with respect to a normal direction of a surface of the bottom plate onto which the image is projected.

APPENDIX 7

The mammography apparatus according to any one of appendices 1 to 6, in which the image includes information indicating an imaging condition for imaging the breast, and in the compression plate, a region onto which the information is projected is subjected to light transmission suppression processing for suppressing transmission of light.

What is claimed is:

1. A mammography apparatus comprising:
    an imaging table on which a breast of a subject is placed;
    a radiation source that emits radiation toward the breast;
    a stand that directly or indirectly supports the radiation source and the imaging table;
    a compression plate that is disposed to be movable between the imaging table and the radiation source and is directly or indirectly supported by the stand, the compression plate including a bottom plate that compresses the breast and side plates provided on at least two locations of a subject side and a stand side of the bottom plate; and
    a projector that is disposed on the stand side with respect to the radiation source, that projects an image toward the compression plate and the imaging table through a plurality of optical elements, and that is accommodated in a radiation source accommodation portion that accommodates the radiation source,
    wherein in a case where a surface on the subject side in the side plate on the stand side is defined as an inner wall surface of the side plate, and an intersection between an imaginary plane formed by extending the inner wall surface toward the projector and an imaginary horizontal line crossing the projector in a horizontal direction is defined as an imaginary intersection, among the plurality of optical elements, an optical element closest to the compression plate on an optical path of light emitted from the projector and directed to the compression plate is disposed on the subject side with respect to the imaginary intersection.

2. The mammography apparatus according to claim 1, wherein the inner wall surface is parallel to a movement direction of the compression plate, and
    a light beam located closest to the stand side in an effective luminous flux emitted from the projector is parallel to the movement direction.

3. The mammography apparatus according to claim 2, wherein on a surface of the bottom plate onto which the image is projected, a position where the inner wall surface rises coincides with a projection position of the light beam located closest to the stand side in the effective luminous flux.

4. The mammography apparatus according to claim 2, wherein in a case where the compression plate is located closest to the projector, on a surface of the bottom plate onto which the image is projected, a projectable range of the image is located on the subject side with respect to the inner wall surface.

5. The mammography apparatus according to claim 1, wherein the inner wall surface is parallel to a normal direction of a surface of the bottom plate onto which the image is projected.

6. The mammography apparatus according to claim 1, wherein an upper end of the inner wall surface is inclined toward the stand side with respect to a normal direction of a surface of the bottom plate onto which the image is projected.

7. The mammography apparatus according to claim 1, wherein the image includes information indicating an imaging condition for imaging the breast, and
   in the compression plate, a region onto which the information is projected is subjected to light transmission suppression processing for suppressing transmission of light.

* * * * *